(12) United States Patent
Bobuk

(10) Patent No.: US 11,340,463 B1
(45) Date of Patent: May 24, 2022

(54) HEAD-MOUNTED DISPLAY DEVICES AND MAGNETIC HINGE THEREFOR

(71) Applicant: FACEBOOK TECHNOLOGIES, LLC, Menlo Park, CA (US)

(72) Inventor: Aaron Bobuk, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 335 days.

(21) Appl. No.: 16/559,542

(22) Filed: Sep. 3, 2019

Related U.S. Application Data

(60) Provisional application No. 62/828,938, filed on Apr. 3, 2019.

(51) Int. Cl.
*G02C 5/22* (2006.01)
*H01Q 1/27* (2006.01)
*G02B 27/01* (2006.01)
*H04N 13/332* (2018.01)

(52) U.S. Cl.
CPC ........... *G02B 27/0176* (2013.01); *G02C 5/22* (2013.01); *H04N 13/332* (2018.05); *G02B 2027/0159* (2013.01); *G02B 2027/0178* (2013.01); *G02B 2027/0187* (2013.01)

(58) Field of Classification Search
CPC ........ G02B 27/0176; G02B 2027/0159; G02B 2027/0178; G02B 27/0187; H04N 13/332; G02C 5/22
See application file for complete search history.

(56) References Cited

U.S. PATENT DOCUMENTS 9,638,934 B2 * 5/2017 Kidouchim .......... G02C 5/2209
10,957,501 B1 * 3/2021 Brandt .................. G06F 1/1658

* cited by examiner

*Primary Examiner* — Kwang-Su Yang
(74) *Attorney, Agent, or Firm* — Morgan, Lewis & Bockius LLP

(57) ABSTRACT

An artificial-reality device is provided. The artificial-reality device includes a frame having at least one temple section (e.g., a frame arm) and a front section, where the front section is configured to hold at least one lens. The artificial-reality device also includes a hinge pivotally coupling the at least one temple section and the front section. The hinge includes: (A) a front magnetic component that includes a static magnet, and (B) a rear magnetic component, coupled to the at least one temple section, that includes: (i) two or more primary magnets oriented so as to be attracted to the static magnet of the front magnetic component, and (ii) at least one secondary magnet, positioned between the two or more primary magnets, oriented so as to be repelled by the static magnet of the front magnetic component.

20 Claims, 17 Drawing Sheets

HEAD-MOUNTED DISPLAY DEVICES AND MAGNETIC HINGE THEREFOR

RELATED APPLICATION

This application claims priority to U.S. Provisional Patent Application No. 62/828,938, filed Apr. 3, 2019, entitled "Magnetic Hinge For Head-Mounted Display Devices," which is incorporated by reference herein in its entirety.

TECHNICAL FIELD

This application relates generally to headsets (e.g., head-mounted display devices), and specifically to hinges used in the headsets.

BACKGROUND

Headsets, including head-mounted display devices (also called herein head-mounted displays), are gaining popularity as a means for providing audio and/or visual information to a user. Head-mounted display devices are used for virtual reality and/or augmented reality operations. In some cases, head-mounted display devices take the form of traditional eyeglasses (e.g., a frame with foldable arms). In such designs, busing (e.g., transmission lines, such as coaxial cables) inside the display device's frame running from the temple area to the lens area becomes stressed when the display device is folded (e.g., the frame arms are folded towards a front portion of the frame). As such, challenges persist with incorporating electrical components, such as transmission lines, into streamlined head-mounted display devices (e.g., head-mounted display devices in the form of traditional eyeglasses).

SUMMARY

Thus, there is a need for a hinge, which is the location where a transmission line experiences the greatest stress, to be included in head-mounted display devices that minimizes damage to transmission lines.

In accordance with some embodiments, a display device (e.g., the display device 100 in FIG. 1) is provided. The display device includes a frame having at least one temple section (e.g., a frame arm) and a front section, where the front section is configured to hold at least one lens (e.g., the display 104-A in FIG. 1). The display device also includes a hinge (e.g., the hinge 114 in FIG. 3A) pivotally coupling the at least one temple section and the front section. The hinge includes (A) a rear magnetic component, coupled to the at least one temple section, which includes: (i) one or more negative polarity regions, and (ii) one or more positive polarity regions interspersed between the one or more negative polarity regions, and (B) a front magnetic component that includes at least one region of positive polarity. In some embodiments, the rear magnetic component includes an annular region, and a transmission line (e.g., transmission line 118) of the display device passes through the opening of the rear magnetic component.

In some embodiments, the hinge also includes an enclosure integrated with (or attached to) the front section, and the enclosure includes one or more openings. The transmission line of the display device may also pass through the one or more openings of the enclosure.

In some embodiments, when the hinge is in a first state, a first region of the one or more negative polarity regions is adjacent and magnetically attracted to the at least one region of positive polarity. For example, in FIG. 4A, the hinge 114 is in the first state, and in such a state, the at least one temple section is unfolded from the front section. Thus, when in the first state, a user could be wearing the display device.

In some embodiments, when the hinge is in a second state, a second region of the one or more negative polarity regions is adjacent and magnetically attracted to the at least one region of positive polarity. For example, in FIG. 4C, the hinge 114 is in the second state, and in such a state, the at least one temple section is folded towards the front section. Thus, when in the second state, a user cannot wear the display device.

In some embodiments, when the hinge is in a third state (different from the first and second states), a region of the one or more positive polarity regions is adjacent to and magnetically repelled by the at least one region of positive polarity. The third state is an intermediate state between the first and second states. To illustrate, as the at least one temple section is closed (e.g., when it is folded at a 45-degree angle), the positive polarity of the rear magnetic component repels the positive polarity of the front magnetic component, which creates the sensation of pushing the at least one temple section either back to a straight position (e.g., the first state) or to a closed position (e.g., the second state).

In some embodiments, when the hinge is in the first state, the rear magnetic component is in a first position (e.g., the position shown in FIGS. 4A and 4B). Furthermore, when the hinge is in the second state, the rear magnetic component is in a second position different from the first position (e.g., the position shown in FIG. 4C). In some embodiments, to transition from the first state to the second state, the second magnetic component has to rotate a predetermined amount (e.g., greater than 50 degrees).

In another aspect, an artificial-reality device is provided. The artificial-reality device includes a head-mounted display with (a) a frame that includes at least one temple section and a front section. The front section is configured to hold at least one lens and (b) a hinge pivotally coupling the at least one temple section and the front section. The hinge includes (A) a front magnetic component, which includes a static magnet, and (B) a rear magnetic component, coupled to the at least one temple section, which includes: (i) two or more primary magnets oriented so as to be attracted to the static magnet of the front magnetic component, and (ii) at least one secondary magnet, positioned between the two or more primary magnets, oriented so as to be repelled by the static magnet of the front magnetic component.

In some embodiments of the artificial-reality device, when the hinge is in a first state, a first magnet of the two or more primary magnets is adjacent and magnetically attracted to the static magnet of the front magnetic component (e.g., as shown in FIGS. 4A and 5A). Furthermore, when the hinge is in a second state, a second magnet of the two or more primary magnets is adjacent and magnetically attracted to the static magnet of the front magnetic component (e.g., as shown in FIGS. 4C and 5B).

In some embodiments of the artificial-reality device, when the hinge is in a third state, the at least one secondary magnet is adjacent to and magnetically repelled by the static magnet of the front magnetic component.

In some embodiments of the artificial-reality device, the hinge includes another secondary magnet, positioned adjacent to the second magnet of the two or more primary magnets, which is magnetically repelled by the static magnet of the front magnetic component when the hinge is in the second state.

In some embodiments of the artificial-reality device, when the hinge is in the first state, the rear magnetic component is in a first position (e.g., an unfolded position). Further, when the hinge is in the second state, the rear magnetic component is in a second position (e.g., a folded position) different from the first position.

In some embodiments of the artificial-reality device, the rear magnetic component is rotated a predetermined amount to transition from the first position to the second position. In some embodiments, the predetermined amount is at least 50 degrees.

In some embodiments of the artificial-reality device, the rear-magnetic component includes a spring configured to push (i.e., bias) the at least one temple section inwards when the rear magnetic component is in the first position.

In some embodiments of the artificial-reality device, the rear magnetic component of the hinge includes an opening, and the artificial-reality device further includes a transmission line that conveys data between the at least one temple section and the front section, whereby the transmission line passes through the opening of the rear magnetic component.

In some embodiments, the artificial-reality device further includes an artificial-reality engine that generates artificial-reality data. Furthermore, the at least one lens may be an electronic display that is configured to display the artificial-reality data generated by the artificial-reality engine. In such embodiments, the transmission line conveys the artificial-reality data to the electronic display from the artificial-reality engine.

In some embodiments of the artificial-reality device, the hinge is configured to rotate about a first axis, and the opening of the hinge is defined along the first axis.

In some embodiments of the artificial-reality device, the hinge further includes an enclosure integrated with (or attached to) the front section, and the front magnetic component is coupled to a portion of the enclosure. Furthermore, the enclosure of the hinge may include an opening at one end, and an elongated portion of the rear magnetic component can be inserted through the opening to assemble the hinge. In addition, the hinge may include a cap that fits into the opening of the enclosure.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first and second are used herein to describe various elements, these elements should not be limited by these terms. These terms are used only to distinguish one element from another. For example, a first region could be termed a second region, and, similarly, a second region could be termed a first region, without departing from the scope of the various described embodiments. The first region and the second region are both regions, but they are not the same region.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof. The term "exemplary" is used herein in the sense of "serving as an example, instance, or illustration" and not in the sense of "representing the best of its kind."

Figure 1:
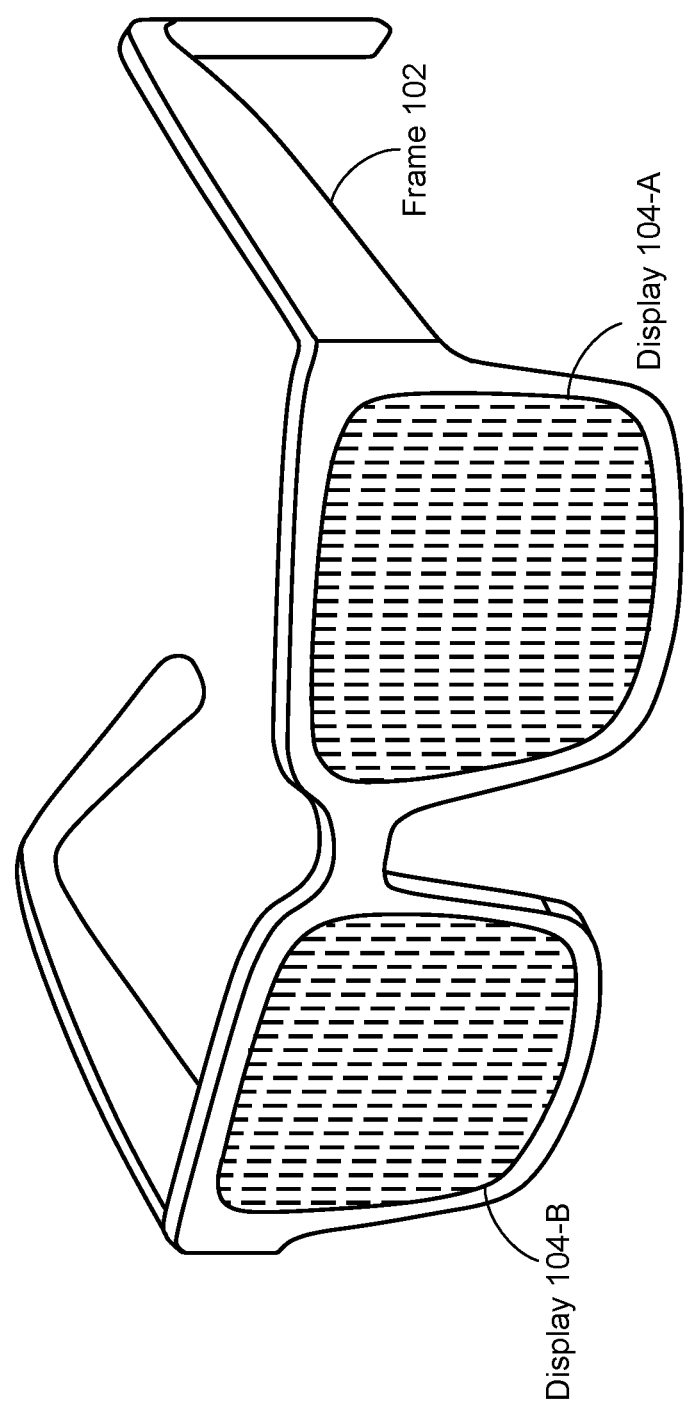
FIG. 1 is a perspective view of an artificial-reality device in accordance with some embodiments.

FIG. 1 is a perspective view of an artificial-reality device 100 in accordance with some embodiments. The artificial-reality device 100 is configured to be worn on the head of a user. When worn, the artificial-reality device 100 is sometimes referred to as a head-mounted display. As shown in FIG. 1, the artificial-reality device 100 includes a frame 102 and multiple displays 104-A and 104-B (also called lenses). The displays 104 are configured for presenting visual content (e.g., augmented-reality content, virtual-reality content, mixed-reality content, or any combination thereof) to a user.

Figure 2:
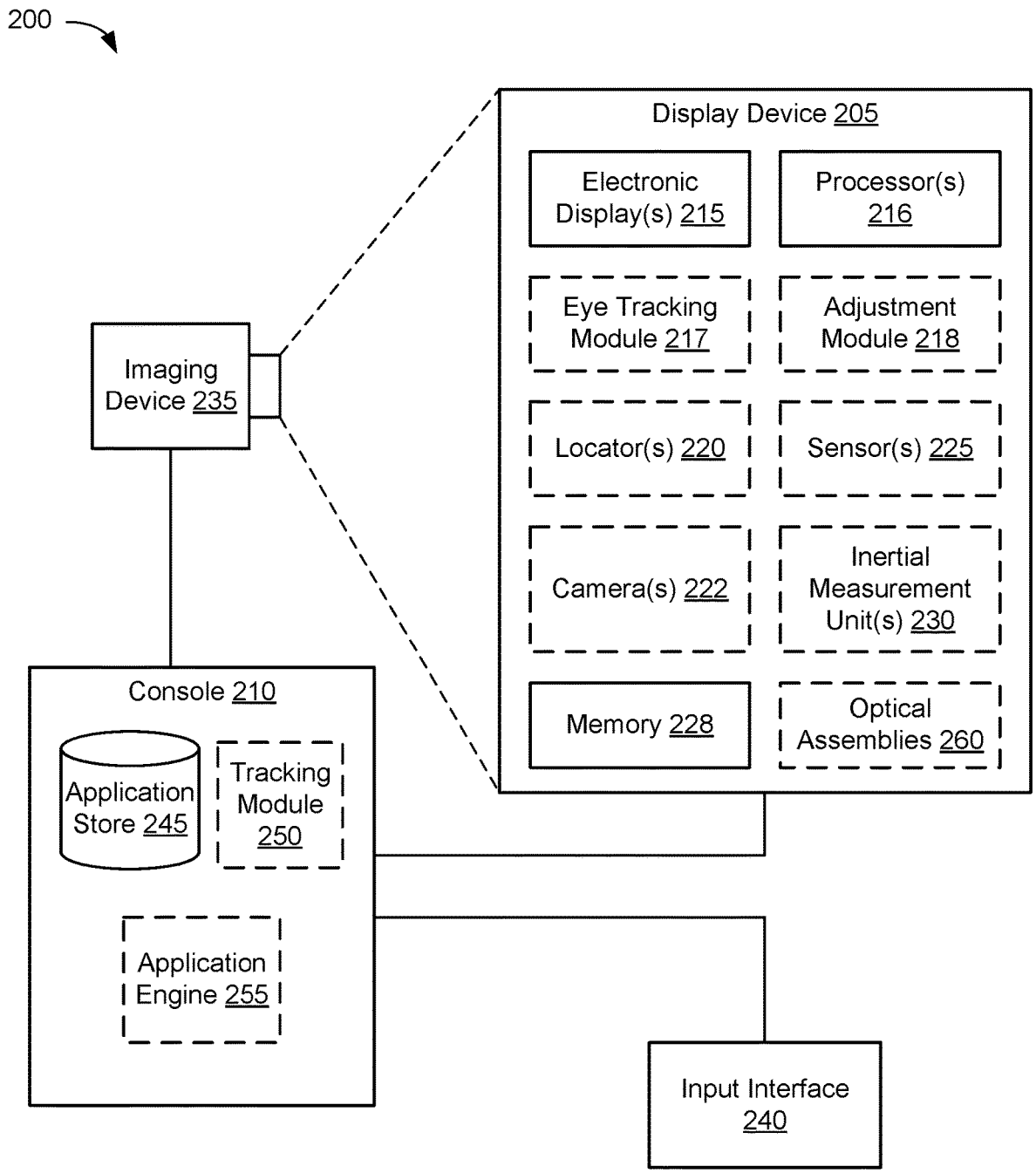
FIG. 2 is a block diagram of a system including an artificial-reality device in accordance with some embodiments.

In some embodiments, the artificial-reality device 100 includes one or more components described herein with respect to FIG. 2. In some embodiments, the display device 100 includes additional components not shown in FIG. 2. Additional examples of the artificial-reality device 100 are discussed below with reference to FIGS. 6-8.

FIG. 2 is a block diagram of system 200 in accordance with some embodiments. The system 200 includes a display device 205, an imaging device 235, and an input interface 240, each of which is coupled to the console 210. While FIG. 2 shows an example of a system 200, including one display device 205, one imaging device 235, and one input interface 240, in other embodiments, any number of these components may be included in the system 200. For example, there may be multiple display devices 205, each having an associated input interface 240 and being monitored by one or more imaging devices 235, with each display device 205, each input interface 240, and each imaging device 235 communicating with the console 210. In alternative configurations, different and/or additional components may be included in the system 200. For example, in some embodiments, the console 210 is connected via a network (e.g., the Internet) to the system 200 or is self-contained as part of the display device 205 (e.g., physically located inside the display device 205). In some embodiments, the display device 205 is used to create mixed reality by adding in a view of the real surroundings. Thus, the display device 205 and the system 200 described herein can deliver virtual reality, mixed reality, augmented reality, or some combination thereof.

In some embodiments, as shown in FIG. 1, the display device 205 is a head-mounted display, which presents media to a user. Examples of media presented by the display device 205 include one or more images, video, audio, or some combination thereof. In some embodiments, audio is presented via an external device (e.g., speakers and/or headphones), which receives audio information from the display device 205, the console 210, or both, and presents audio data based on the audio information. In some embodiments, the display device 205 immerses a user in a virtual environment.

In some embodiments, the display device 205 also acts as an augmented reality (AR) headset. In these embodiments, the display device 205 augments views of a physical, real-world environment with computer-generated elements (e.g., images, video, and/or sound). Moreover, in some embodiments, the display device 205 is able to cycle between different types of operation. Thus, the display device 205 may operate as a virtual reality (VR) device, an AR device, as glasses, or as some combination thereof (e.g., glasses with no optical correction, glasses optically corrected for the user, sunglasses, or some combination thereof) based on instructions from an application engine 255.

In some embodiments, the display device 205 includes one or more of the following components: an electronic display 215 (also called lenses), one or more processors 216, an eye tracking module 217, an adjustment module 218, one or more locators 220, one or more position sensors 225, one or more position cameras 222, memory 228, one or more inertial measurement units (IMUs) 230, one or more optical assemblies 260, or a subset or superset thereof (e.g., the display device 205 with an electronic display 215, one or more processors 216, and memory 228, without any of the other listed components). Some embodiments of the display device 205 have different modules than those described here. Similarly, the functions can be distributed among the modules in a different manner than is described here.

In some embodiments, the display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

The console 210 provides media to the display device 205 for presentation to the user in accordance with information received from one or more of: the imaging device 235, the display device 205, and the input interface 240. In the example shown in FIG. 2, the console 210 includes an application store 245, a tracking module 250, and an application engine 255. Some embodiments of the console 210 have different modules than those described in conjunction with FIG. 2. Similarly, the functions further described below may be distributed among components of the console 210 in a different manner than is described here.

When the application store 245 is included in the console 210, the application store 245 stores one or more applications for execution by console 210. An application is a group of instructions, that when executed by a processor, generates content for presentation to the user. Content generated by the processor based on an application may be in response to inputs received from the user via movement of the display device 205 or the input interface 240. Examples of applications include: gaming applications, conferencing applications, educational applications, video playback applications, or other suitable applications.

When the tracking module 250 is included in the console 210, the tracking module 250 calibrates the system 200 using one or more calibration parameters and may adjust one or more calibration parameters to reduce error in determination of the position of the display device 205. For example, the tracking module 250 adjusts the focus of imaging device 235 to obtain a more accurate position for observed locators on the display device 205. Moreover, calibration performed by tracking module 250 also accounts for information received from the IMU 230. Additionally, if tracking of the display device 205 is lost (e.g., the imaging device 235 loses line of sight of at least a threshold number of the locators 220), the tracking module 250 re-calibrates some or all of the system 200.

In some embodiments, the tracking module 250 tracks movements of the display device 205 using second calibration data from the imaging device 235. For example, the tracking module 250 determines positions of a reference point of the display device 205 using observed locators from the second calibration data and a model of the display device 205. In some embodiments, the tracking module 250 also determines positions of a reference point of the display device 205 using position information from the first calibration data. Additionally, in some embodiments, the tracking module 250 uses portions of the first calibration data, the second calibration data, or some combination thereof, to predict a future location of the display device 205. The tracking module 250 provides the estimated or predicted future position of the display device 205 to the application engine 255.

The application engine 255 executes applications within the system 200 and receives position information, acceleration information, velocity information, predicted future positions, or some combination thereof of the display device 205 from the tracking module 250. Based on the received information, the application engine 255 determines content to provide to the display device 205 for presentation to the user. For example, if the received information indicates that the user has looked to the left, the application engine 255 generates content for the display device 205 that mirrors the user's movement in a virtual environment. Additionally, the application engine 255 performs an action within an application executing on the console 210 in response to an action request received from the input interface 240 and provides feedback to the user that the action was performed. The provided feedback may be visual or audible feedback via the display device 205 or haptic feedback via the input interface 240.

FIGS. 3A through 5C illustrate a frame 102 of the artificial-reality device 100. For ease of discussion and illustration, only half of the artificial-reality device 100 is illustrated and discussed in FIGS. 3A through 5C. The discussion below, however, can be equally applied to the artificial-reality device 100 as a whole, e.g., the frame 102 of the artificial-reality device 100 can include: (i) a first hinge 114-A that pivotally couples a first temple section (e.g., a first temple arm) with the front section 112 of the frame 102, and (ii) a second hinge 114-B that pivotally couples a second temple section (e.g., a second temple arm) with the front section 112 of the frame 102.

Figure 3A:
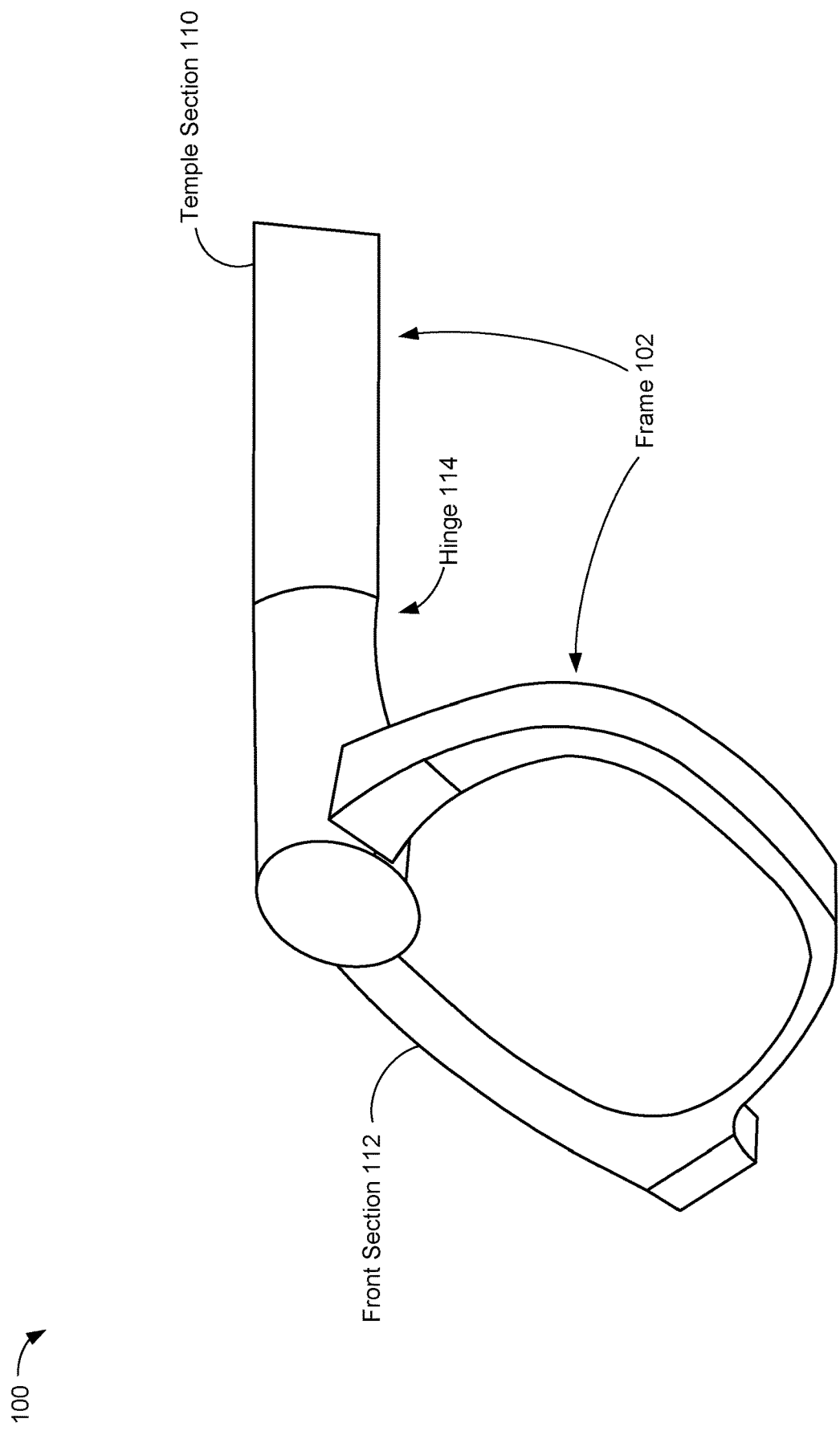
FIG. 3A is a close-up isometric view of an example artificial-reality device in accordance with some embodiments.

FIG. 3A is a close-up isometric view of the artificial-reality device 100 in accordance with some embodiments. As shown, the artificial-reality device 100 includes (i) a frame 102 with a temple section 110 and a front section 112, and (ii) a hinge 114 pivotally coupling the temple section 110 and the front section 112. The front section 112 is configured to hold one or more lenses (e.g., the displays 104 in FIG. 1 and electronic displays 215 in FIG. 2) of the artificial-reality device 100.

The temple section 110 and the front section 112 may be made from the same or different materials. For example, the temple section 110 may be made from plastic while the front section 112 may be made from a metal, such as steel, or vice versa. In some embodiments, the temple section 110 and the front section 112 are distinct components.

Figure 3B:
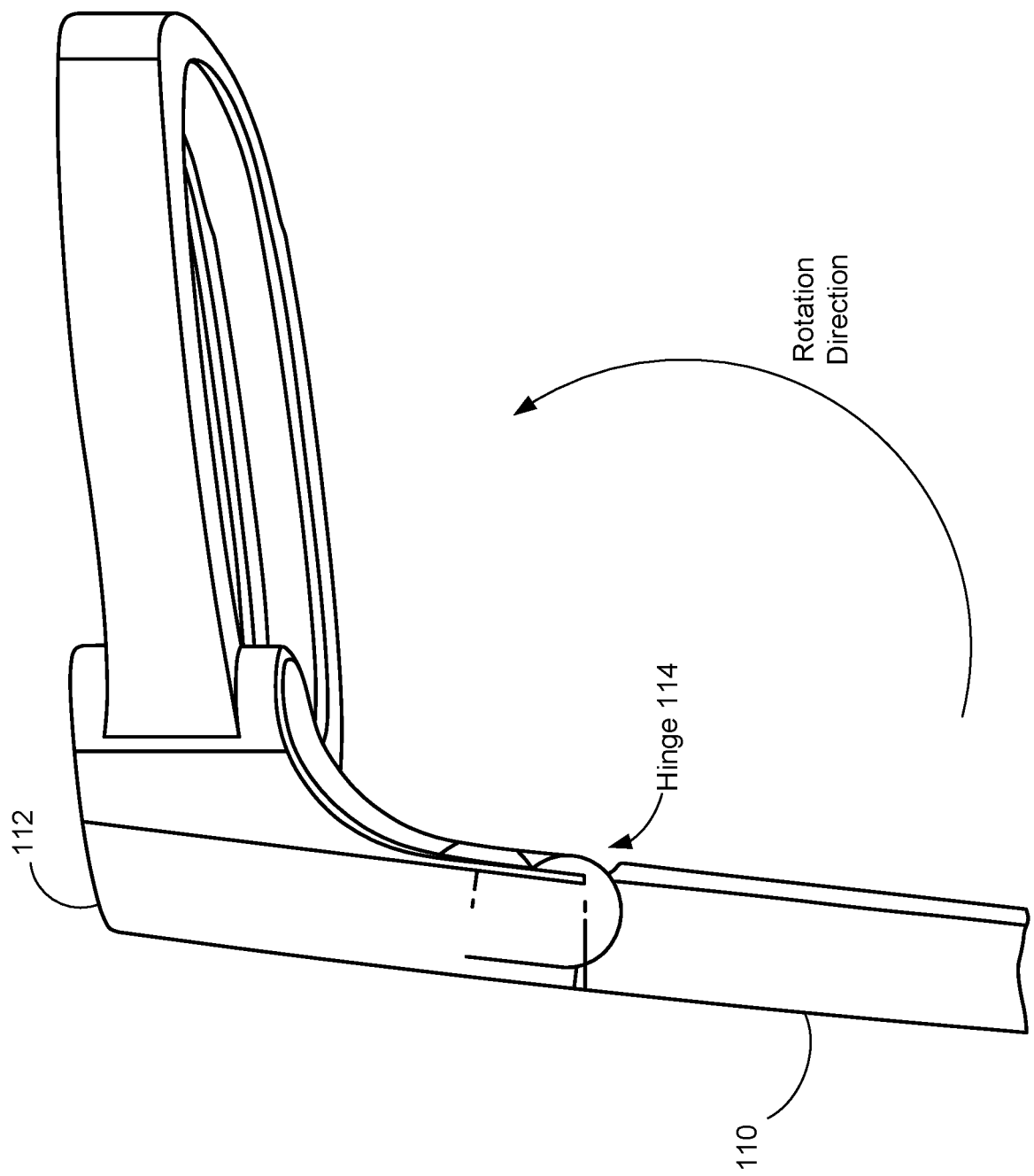
FIG. 3B is a close-up top view of an example artificial-reality device in accordance with some embodiments.

FIG. 3B is a close-up top view of the artificial-reality device 100 in accordance with some embodiments. As shown, the hinge 114 pivotally couples the temple section 110 and front section 112. In other words, the temple section 110 can be folded, via the hinge 114, towards the front section 112 (e.g., in the rotation direction shown in FIG. 3B). In the folded position (not shown), the artificial-reality device 100 has a compact shape that allows for easy storage and transportation.

Figure 3C:
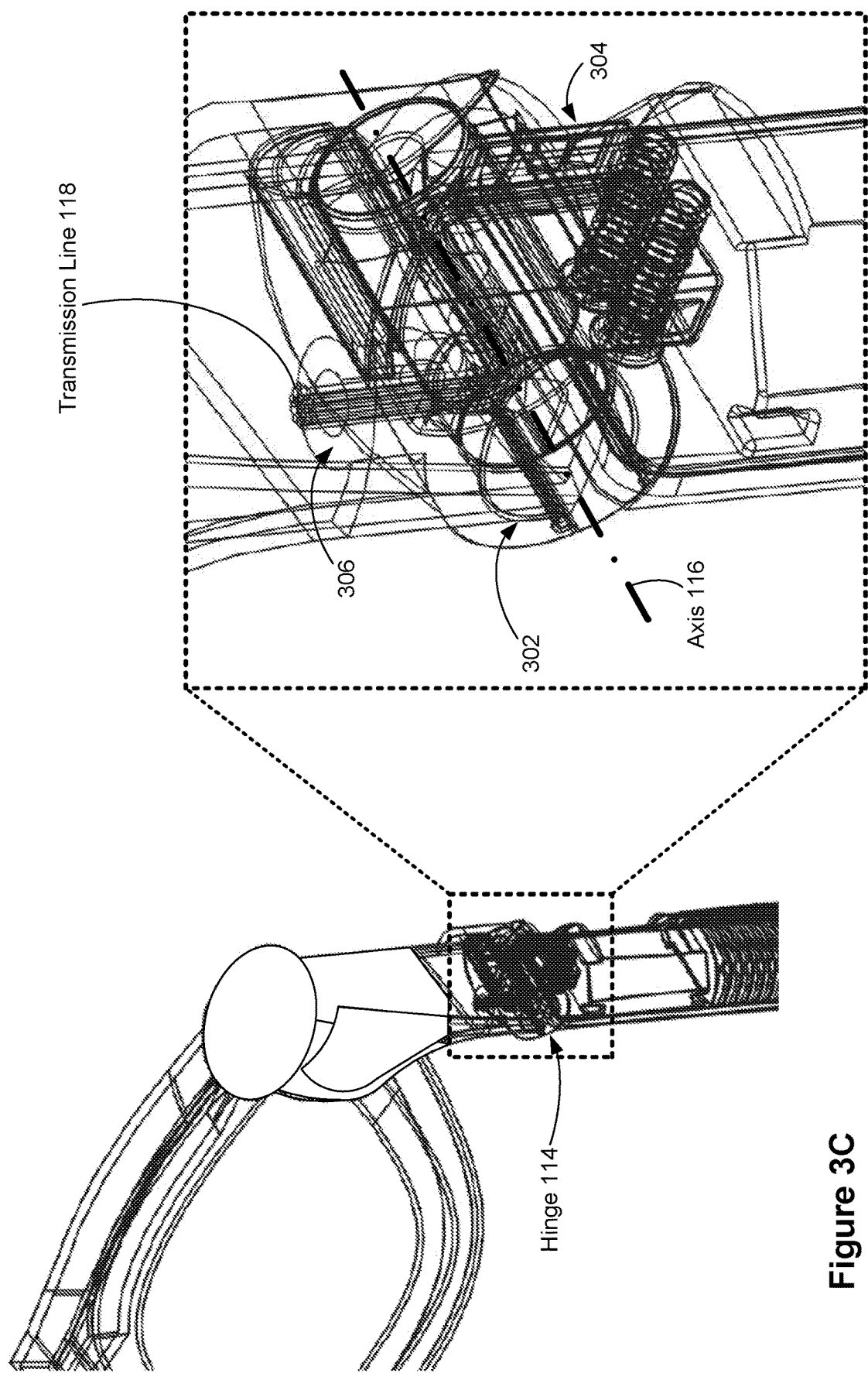
FIG. 3C is a close-up wire view of an example artificial-reality device in accordance with some embodiments.

FIG. 3C is a close-up wire view of the artificial-reality device 100 in accordance with some embodiments. As shown, the hinge 114 is centered about an axis 116, and the hinge 114 is configured to rotate about the axis 116. In addition, the hinge 114 defines an opening 302 through a body portion of the hinge 114, along with an inlet 304 and the outlet 306. The orientation of the opening 302 is perpendicular to orientations of the inlet 304 and the outlet 306 (e.g., the inlet-to-opening-to-outlet makes an S-shape).

A transmission line 118 (e.g., busing that conveys data between the console 210 and the imaging device 235, or the display device 205) enters the hinge 114 via the inlet 304 (which is sized for the transmission line 118), passes through the opening 302 defined through the hinge body (which is also sized for the transmission line 118), and exits the hinge 114 via the outlet 306 (which is also sized for the transmission line 118). Put another way, the transmission line 118 passes through the hinge 114 by making an S-shape (or some other shape), and at least a portion of the transmission line 118 is defined along the axis 116. In such an arrangement, the transmission line 118 avoids being stressed via the hinge 114 when the temple section 110 is folded and unfolded toward the front section 112. In this arrangement, the portion of the transmission line 118 passing through (or otherwise affected by) the hinge 114 is able to freely swivel according to a position of the temple section 110 relative to the front section 112. Thus, the hinge design described herein does not damage the transmission line 118, thus extending the life of the artificial-reality device as a whole. The transmission line 118 is also discussed below with reference to FIGS. 4A-4E and 5A-5C.

Figure 3D:
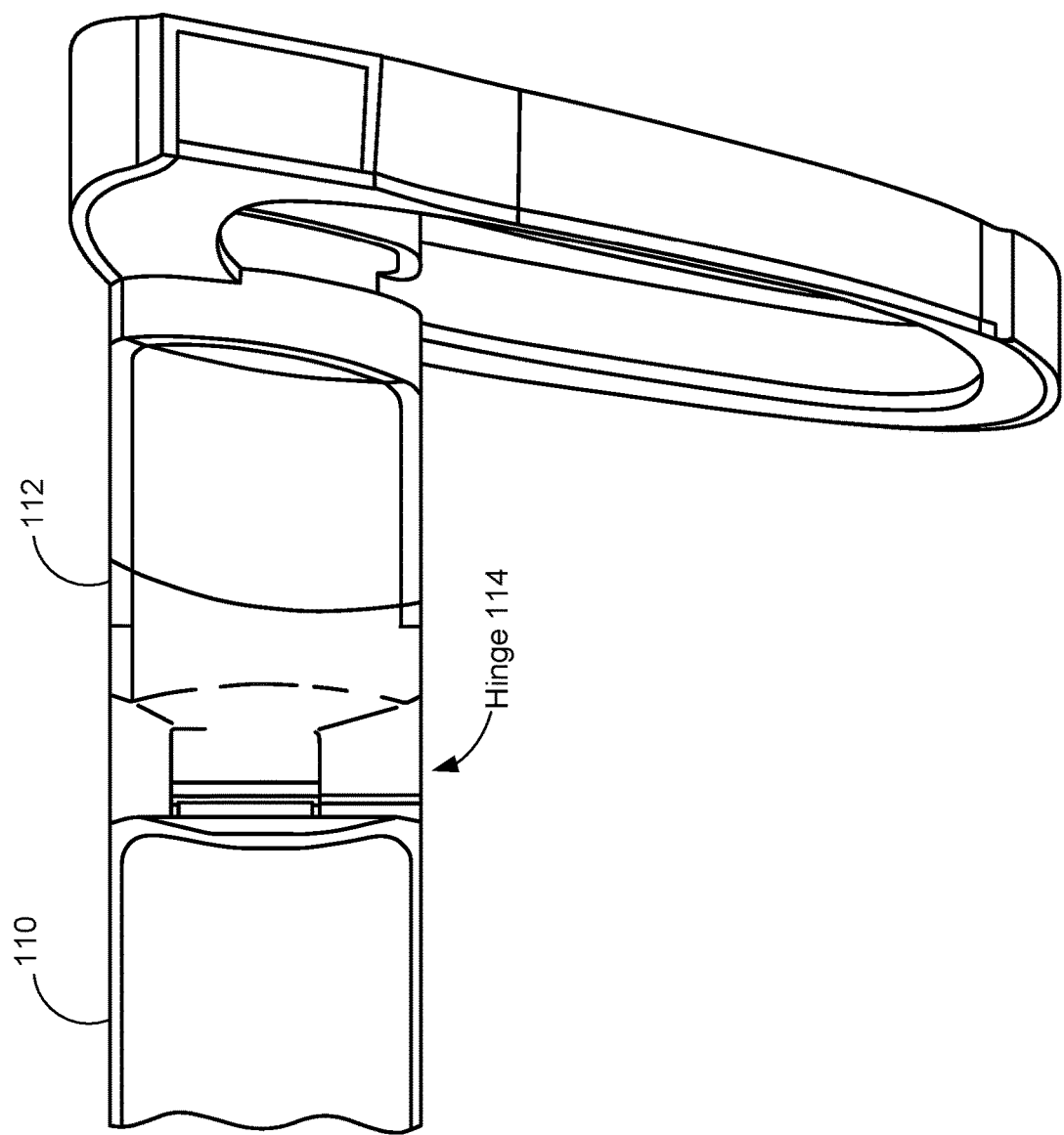
FIG. 3D is a close-up side view of an example artificial-reality device in accordance with some embodiments.

FIG. 3D is a close-up side view of the artificial-reality device 100 in accordance with some embodiments. It is noted that, in some embodiments, the hinge 114 is integrally formed with the temple section 110, the front section 112, both, or neither.

Figure 4A:
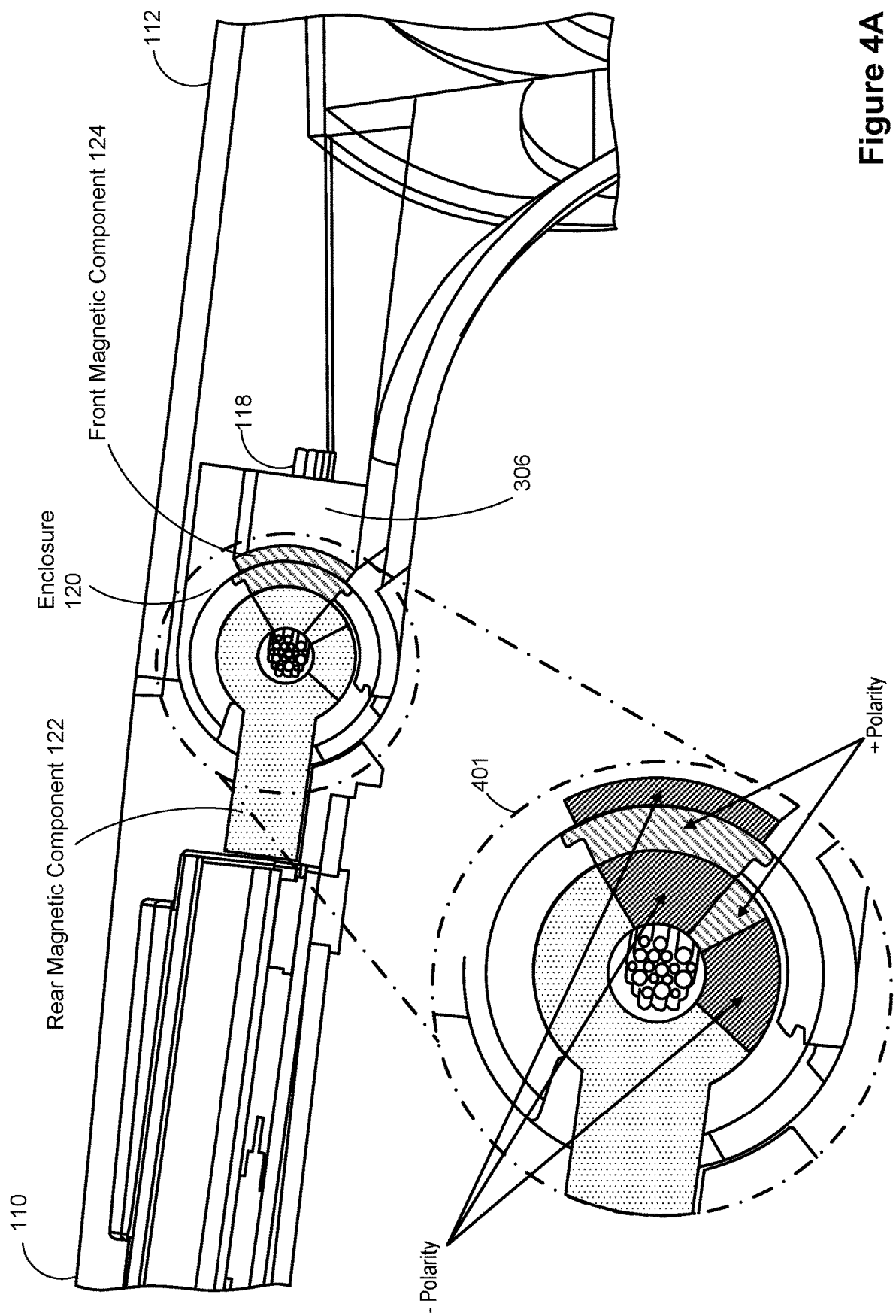
FIG. 4A is a cross-section view of an example artificial-reality device in accordance with some embodiments.

FIG. 4A is a cross-section view of the artificial-reality device 100 in accordance with some embodiments. Specifically, the cross-section view is a top cross-section view, and corresponds to the close-up top view of FIG. 3B.

Figure 4B:
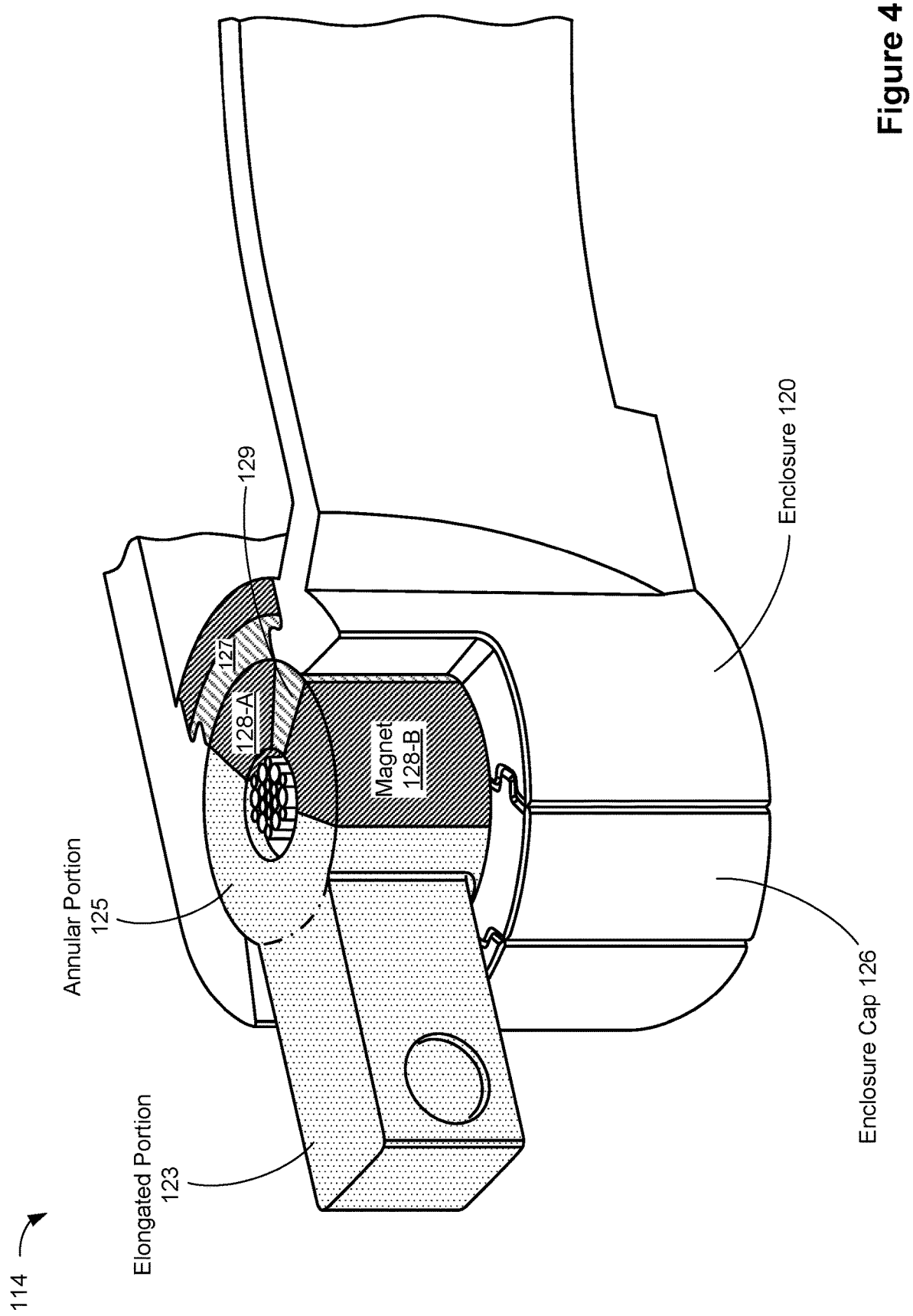
FIG. 4B shows a hinge included in an example artificial-reality device in accordance with some embodiments.
Figure 4C:
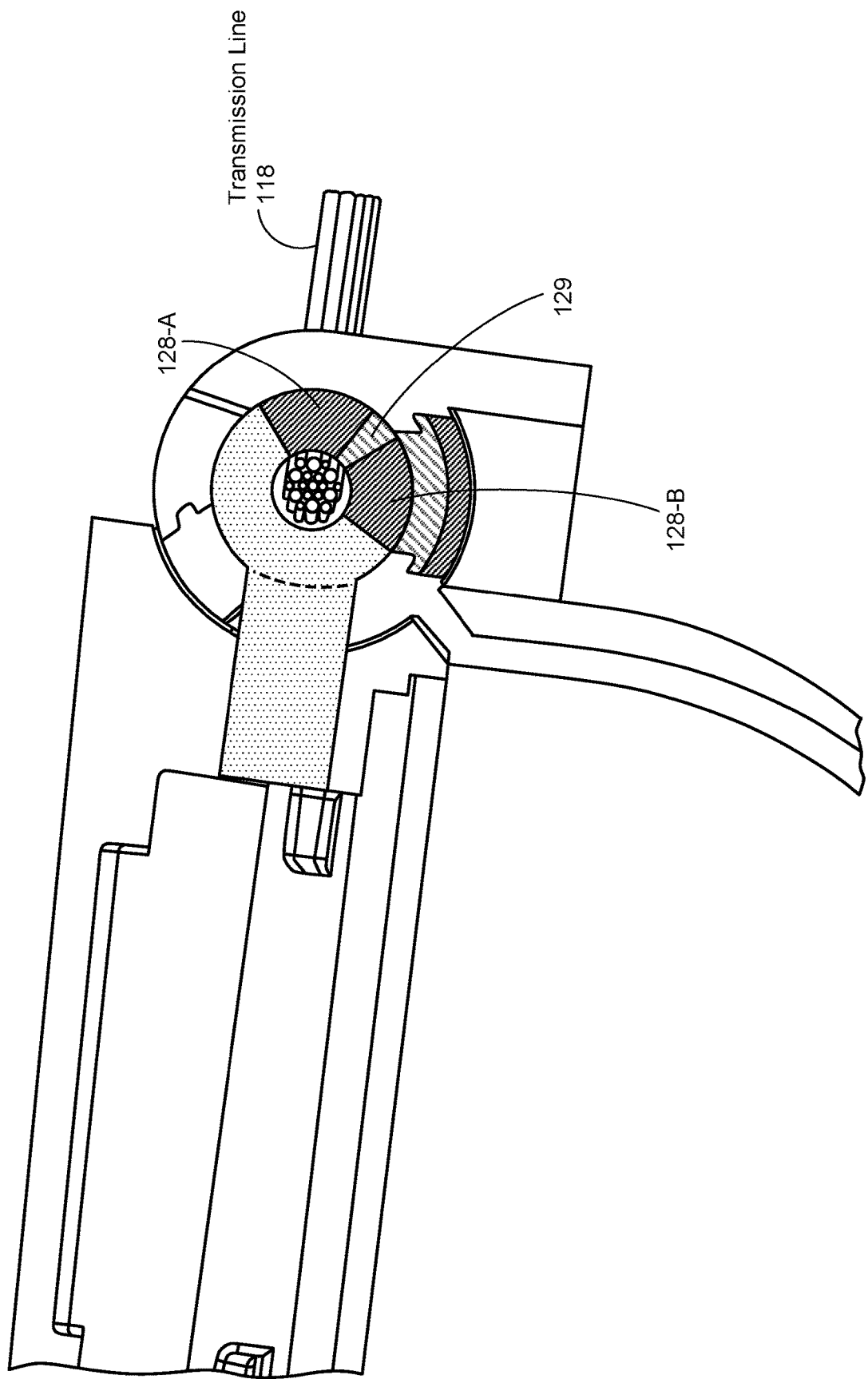
FIG. 4C is a cross-section view of an example artificial-reality device in accordance with some embodiments.

As shown, the hinge 114 includes an enclosure 120 that supports (holds) a rear magnetic component 122 (dotted pattern) and a front magnetic component 124 (diagonal pattern) of the hinge 114. In some embodiments, the rear magnetic component 122 (and in some embodiments, the front magnetic component 124) is a polymagnet, which is a magnet with multiple polarities (e.g., positive and negative) encoded into various portions/regions of the magnet (as shown in FIGS. 4A-4C). The magnified view 401 in FIG. 4A shows example polarities of the rear magnetic component 122 and the front magnetic component 124. It is noted that the polarities shown in the magnified view 401 could be switched (e.g., the negative polarities would be positive polarity, and the positive polarities would be negative polarities).

Figure 5A:
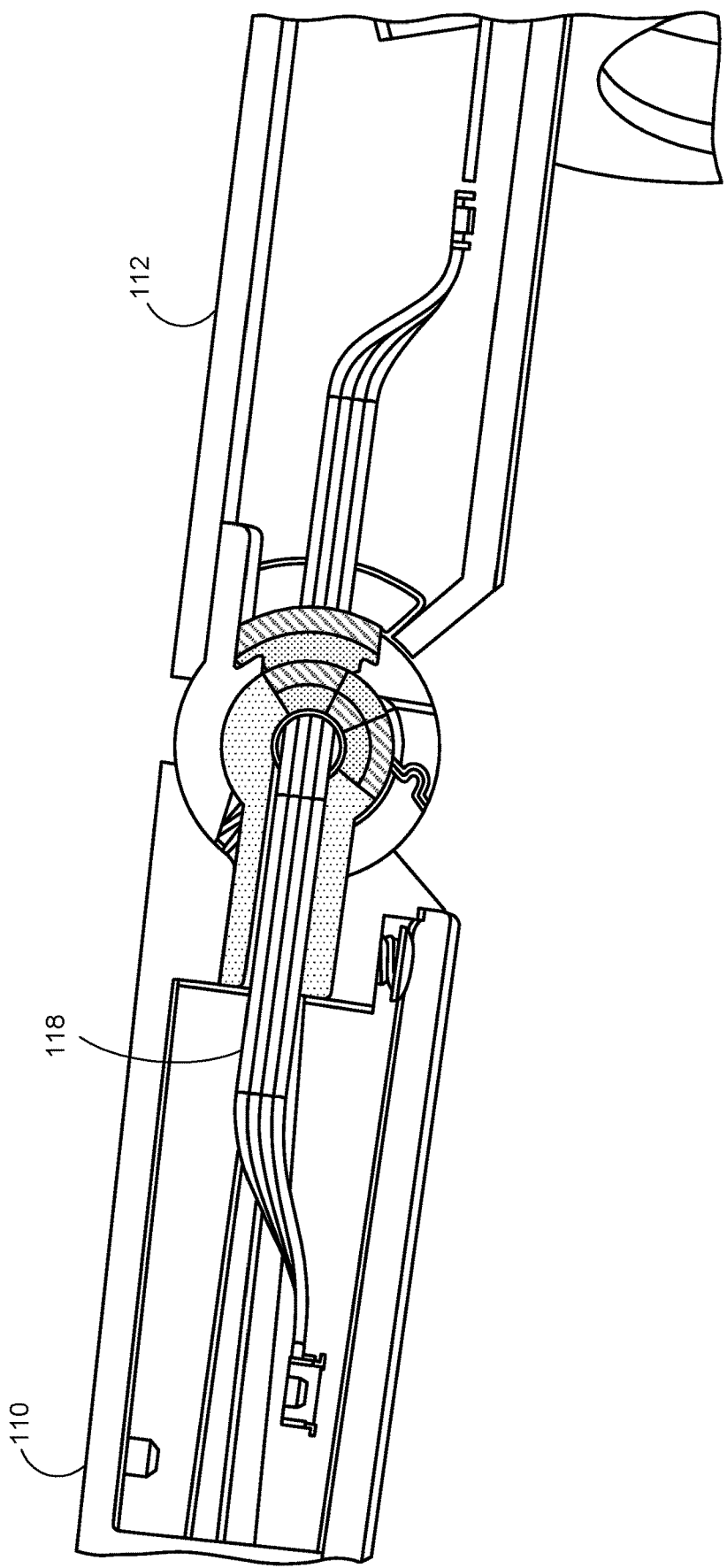
FIG. 5A is a cross-section view of an example artificial-reality device in accordance with some embodiments.
Figure 5B:
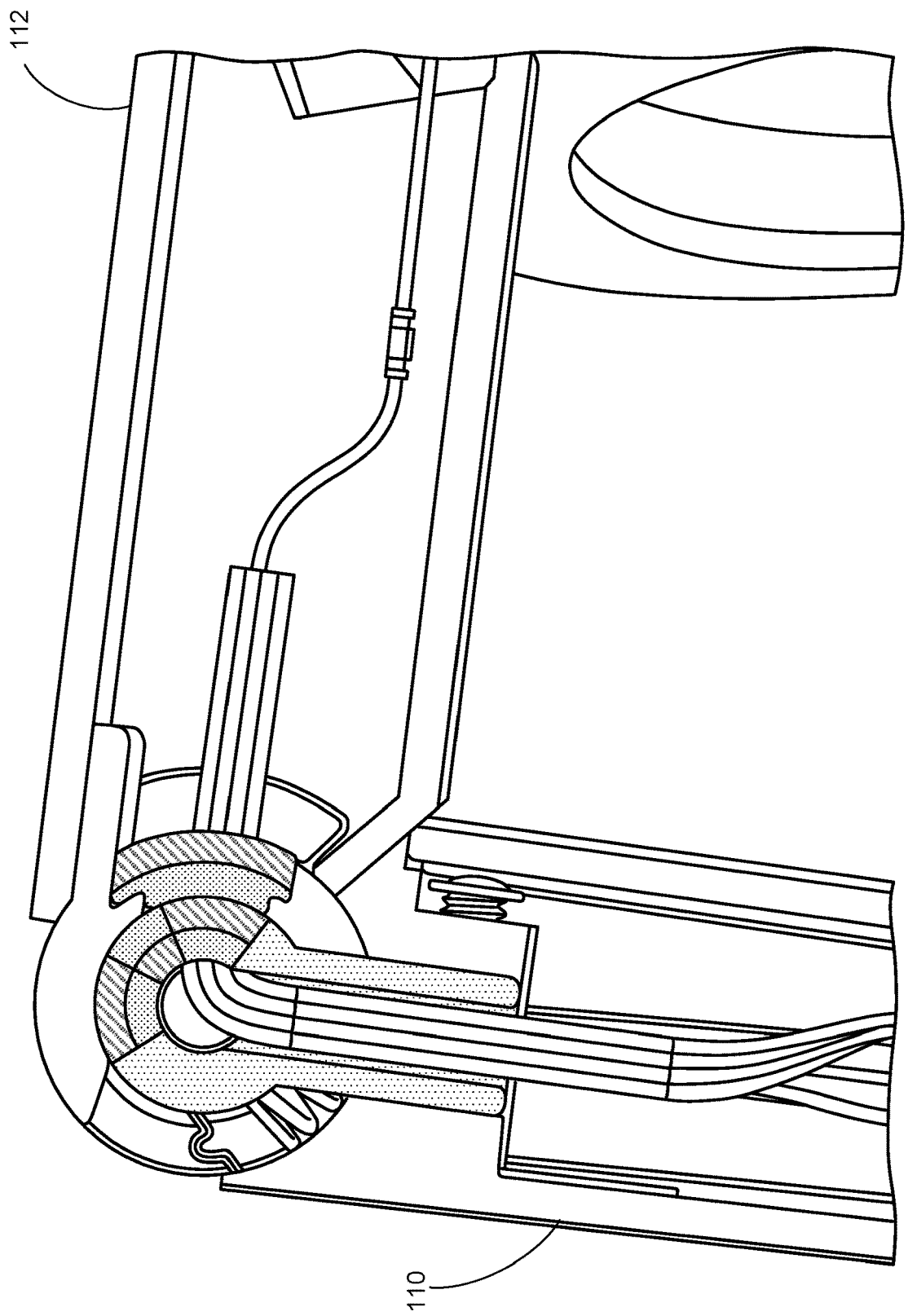
FIG. 5B is a cross-section view of an example artificial-reality device in accordance with some embodiments.
Figure 5C:
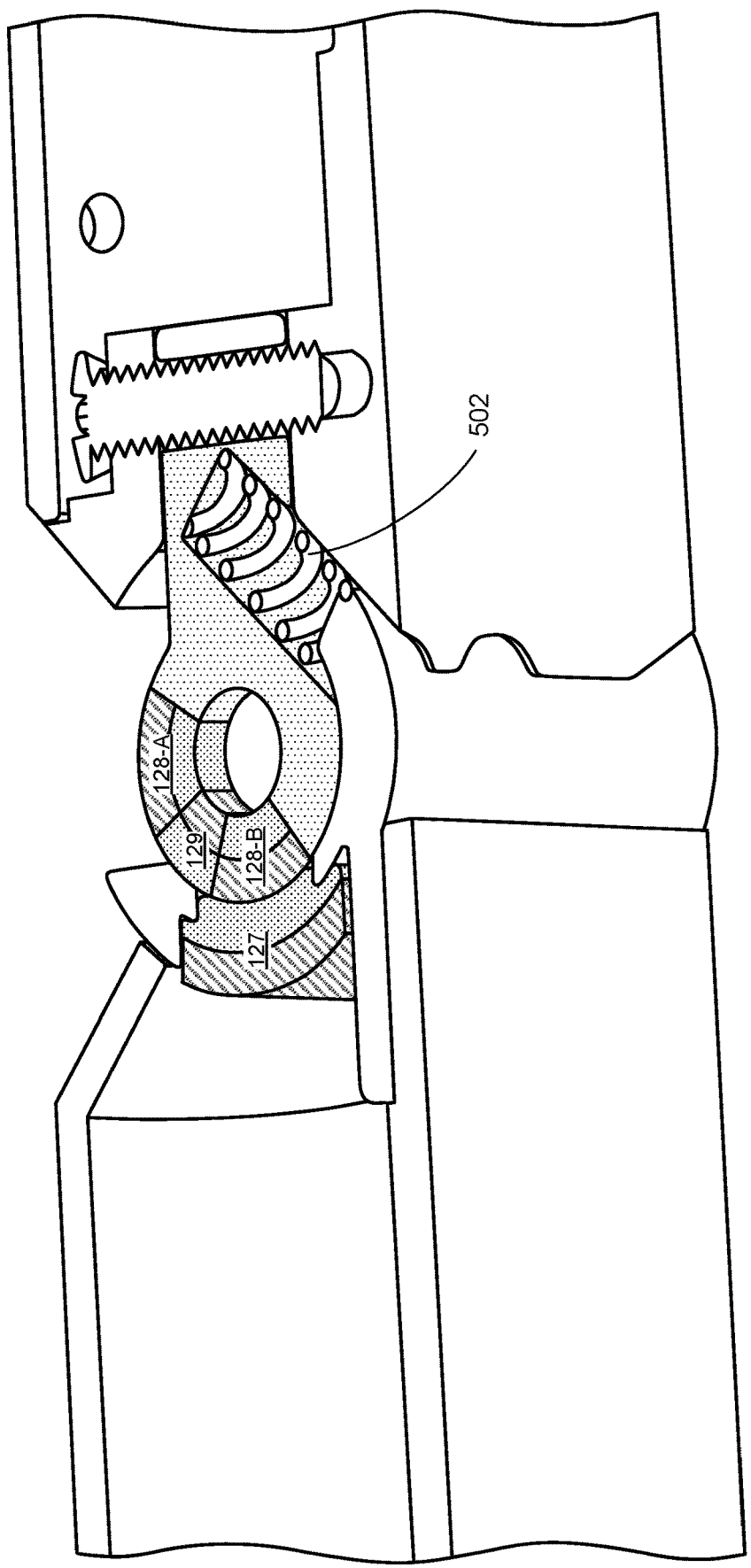
FIG. 5C shows a hinge included in an example artificial-reality device in accordance with some embodiments.

In some other embodiments, the rear magnetic component 122 (and in some embodiments, the front magnetic component 124) is made by attaching individual magnets together to form one larger magnetic assembly (as shown in FIGS. 5A-5C). It is noted that FIGS. 5A-5C show the positive and negative encodings of several magnets included in the hinge 114. It is also noted that while a majority of the discussion below refers to the rear magnetic component 122 and the front magnetic component 124 being composed of distinct magnets, one or both of these components could equally be polymagnets, as mentioned above.

The rear magnetic component 122 and/or the front magnetic component 124 may be manufactured using a variety of manufacturing techniques. As one example, metal injection molding (MIM) may be used to manufacture the rear magnetic component 122 and/or the front magnetic component 124. In another example, the rear magnetic component 122 and/or the front magnetic component 124 may be manufactured by attaching individual magnets together (as mentioned above).

FIG. 4B is a close-up view of the hinge 114 in accordance with some embodiments. In the illustrated embodiment, the rear magnetic component 122 includes an annular portion 125 (dotted pattern) and an elongated portion 123 (dotted pattern), whereby the transmission line 118 is fed through an central opening of the annular portion 125, and the elongated portion 123 is configured to connect with the temple section 110 (e.g., as shown in FIG. 4E). Further, the shape of the enclosure 120 complements the radius of the annular portion 125, and in this way, the rear magnetic component 122 is secured by (e.g., pivotably coupled with) the enclosure 120. While not shown in FIG. 4B, the elongated portion 123 may also define an inlet channel sized for the transmission line 118, an example of which is shown in FIG. 3C (channel 304) and FIG. 5A. Additionally, the annular portion 125 and/or the enclosure 120 may define an outlet channel sized for the transmission line 118, an example of which is shown in FIG. 3C (channel 306) and FIG. 4A (component 306).

In some embodiments (as shown in FIG. 4B), the rear magnetic component 122 also includes: (i) two or more primary magnets 128-A and 128-B, oriented to be attracted to a static magnet 127 of the front magnetic component 124. In particular, a pole (either the negative or positive pole) of each primary magnet 128-A and 128-B is opposite the pole of the static magnet 127 closest to the rear magnetic component 122, thus creating a magnetic attraction between the static magnet 127 and the primary magnets 128-A and 128-B. To illustrate, if the pole of the static magnet 127 closest to the rear magnetic component 122 is the positive pole of the static magnet 127, then each primary magnet 128-A and 128-B is oriented so that a negative pole of each primary magnet 128-A and 128-B is closest to, and thereby magnetically attracted to, the static magnet 127.

The rear magnetic component 122 also includes at least one secondary magnet 129, positioned between the two or more primary magnets 128-A and 128-B, oriented so as to be repelled by the static magnet 127 of the front magnetic component 124. In other words, a pole (negative or positive) of the secondary magnet 129 is the same as the pole of the static magnet 127 closest to the rear magnetic component 122, thus creating a magnetic repulsion between the secondary magnet 129 and the static magnet 127. To illustrate, if the pole of the static magnet 127 closest to the rear magnetic component 122 is the positive pole, then the at least one secondary magnet 129 is oriented so that its positive pole is closest to, and thereby magnetically repelled by the static magnet 127.

In some instances, the two or more primary magnets 128-A and 128-B are referred to as negative polarity regions 128-A and 128-B while the at least one secondary magnet 129 is referred to as the at least one positive polarity region 129. The polarity of the regions 128-A, 128-B, and 129 can, of course, be switched, such that the multiple negative polarity regions 128-A and 128-B would be positive polarity regions 128-A and 128-B and the at least one positive polarity region 129 would be an at least one negative polarity region 129. The key here is that the polarities of the regions 128-A and 128-B are opposite the polarity of the static magnet 127. Note that each magnet will have a negative pole and a positive pole. Therefore, and for the ease of discussion, a magnet in the rear magnetic component 122 is defined herein to have a "positive polarity" when the positive pole of the magnet is the pole closest to the front magnetic component 124. Likewise, a magnet is defined herein to have a "negative polarity" when the negative pole of the magnet is the pole closest to the front magnetic component 124. FIGS. 5A-5C show the negative and positive poles of each magnet 127, 128-A, 128-B, and 129.

In some embodiments, the rear magnetic component 122 includes one or more additional magnets not shown in FIGS. 4A-5C (or, when the rear magnetic component 122 is a polymagnet, it includes another polarized region). For example, the rear magnetic component 122 may include another secondary magnet, positioned adjacent to the primary magnet 128-B, which is magnetically repelled by the static magnet 127 (i.e., the pole of the other secondary magnet closest to the front magnetic component 124 is the same as the pole of the static magnet 127 closest to the rear magnetic component 122). This additional secondary magnet can be used to further "lock" the temple section 110 into its folded position (discussed below). Moreover, this additional secondary magnet provides some degree of resistance when the temple section 110 is folded to its folded position. The resistance provided by the additional secondary magnet signals a user, through a subtle repelling magnetic force, that the temple section 110 is in the folded position.

In some embodiments, the elongated portion 123 and part of the annular portion 125 are made from non-magnetic materials (or materials with weak magnetic properties relative to the magnetic properties of the remaining parts of the annular portion 125). For example, the elongated portion 123 and part of the annular portion 125 (i.e., the part that is not polarized or consisting of magnets) may be made from commodity or engineering plastics. In addition, the primary magnets 128-A and 128-B and the secondary magnet 129 may be integrally formed with the annular portion 125. Alternatively, the primary magnets 128-A and 128-B and the secondary magnet 129 may be chemically or mechanically fastened to the annular portion 125. The elongated portion 123, the annular portion, the primary magnets 128-A and 128-B, and the secondary magnet 129 may be integrally formed together (of the same materials or of different materials) or may be formed from one or more distinct parts.

As discussed above, the front magnetic component 124 includes a static magnetic 127 (i.e., a fixed, stationary magnet), whereby, in some embodiments, a positive pole of the static magnet 127 is closest to the rear magnetic component 122. In other embodiments, the static magnet 127 is flipped so that its negative pole is closest to the rear magnetic component 122. In such embodiments, the orientation of the magnets 128-A, 128-B, and 129 would also be flipped so as to maintain the desired attractions (and repulsions) between the respective magnets. In some embodiments, the static magnet 127 is press fit into a portion of the enclosure 120. Alternatively or in addition, in some embodiments, the static magnet 127 is secured to the enclosure 120 via chemical or mechanical fasteners.

In FIG. 4B, the hinge 114 is in a first state. In the first state, the primary magnet 128-A of the rear magnetic component 122 is adjacent to and magnetically attracted to the static magnet 127 of the front magnetic component 124. Also in the first state, the temple section 110 is unfolded from the front section 112. Thus, when in the first state, a user could be wearing the device 100 (an example of the temple section 110 in the first state is shown in FIG. 3A). In the first state (and as a result of the magnetic attraction between the primary magnet 128-A and the static magnet 127), the temple section 110 is "locked" into its position shown in FIGS. 3A and 4A (also called the "first position" or "unfolded position"). The temple section 110 is "locked" in the sense that some minimum force is needed to transition the temple section 110 from the first state (i.e., some minimum force is needed to overcome the magnetic force between the primary magnet 128-A and the static magnet 127).

FIG. 4C is a cross-section view of the artificial-reality device 100 in accordance with some embodiments. In FIG. 4C, the hinge 114 is in a second state. In the second state, the other primary magnet 128-B of the rear magnetic component 122 is adjacent to and magnetically attracted to the static magnet 127 of the front magnetic component 124. Also in the second state, the temple section 110 is folded toward the front section 112. Thus, when in the second state, a user could not be wearing the device 100. In the second state (and as a result of the magnetic attraction between the static magnet 127 of the front magnetic component 124 and the other primary magnet 128-B of the rear magnetic component 122), the temple section 110 is "locked" into the folded position (also called the "second position"). Again, the temple section 110 is "locked" in the sense that some minimum force is needed to transition the temple section 110 from the second state (i.e., to overcome the magnetic force between the static magnet 127 and the primary magnet 128-B). The minimum force needed to transition from the second state to the first state may be equal to or differ from the minimum force needed to transition from the first state to the second state. The difference in force (or lack thereof) depends on the similarities between the two primary magnets 128-A and 128-B (e.g., if the primary magnet 128-A is larger than the other primary magnet 128-B, the minimum force needed to transition from the first state to the second state will be larger than the minimum force needed to transition from the second state to the first state).

During a transition from the first state to the second state (e.g., a transition between the state/position shown in FIG. 4A to the state/position shown in FIG. 4C), or vice versa, the secondary magnet 129 of the rear magnetic component 122 is temporarily adjacent to and magnetically repelled from the static magnet 127 of the front magnetic component 124. To illustrate, as the temple section 110 is closed (e.g., when it is folded at a 45-degree angle), the secondary magnet 129 of the rear magnetic component 122 is repelled by the static magnet 127 of the front magnetic component 124, which creates a sensation of pushing the temple section 110 either back to a straight position (e.g., the first state) or to a closed position (e.g., the second state). Accordingly, in order to transition the rear magnetic component 122 from the first state to the second state, the rear magnetic component 122 must be rotated a predetermined amount, such as 50 degrees or greater. Once the rear magnetic component 122 is rotated past this threshold (e.g., 50 degrees), the other primary magnet 128-B magnetically attracts the static magnet 127 (i.e., the magnetic forces created between the other primary magnet 128-B and the static magnet 127 overpower the magnetic forces created between the secondary magnet 129 and the static magnet 127).

Figure 4D:
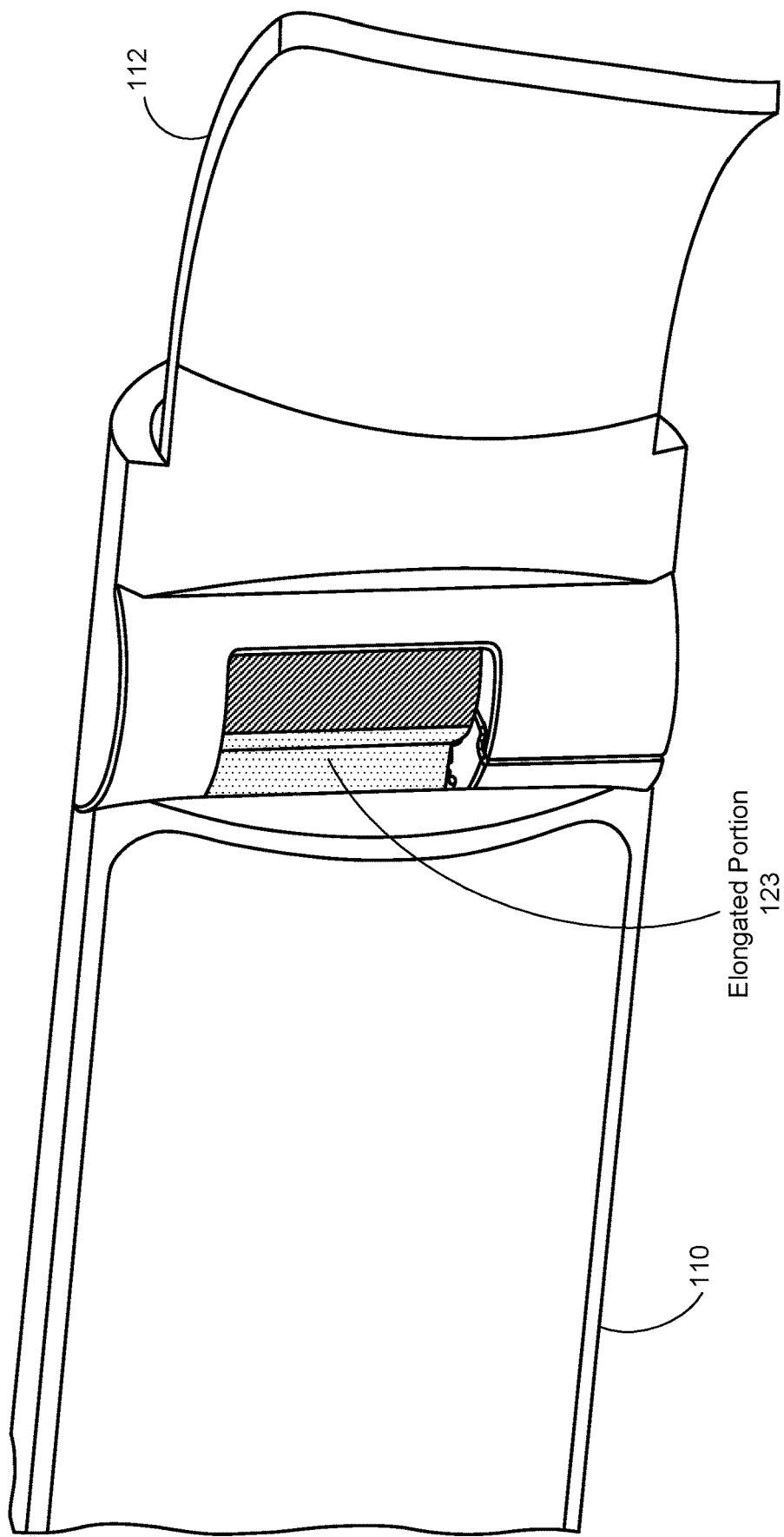
FIG. 4D is a close-up side view of an example artificial-reality device, including a hinge, in accordance with some embodiments.
Figure 4E:
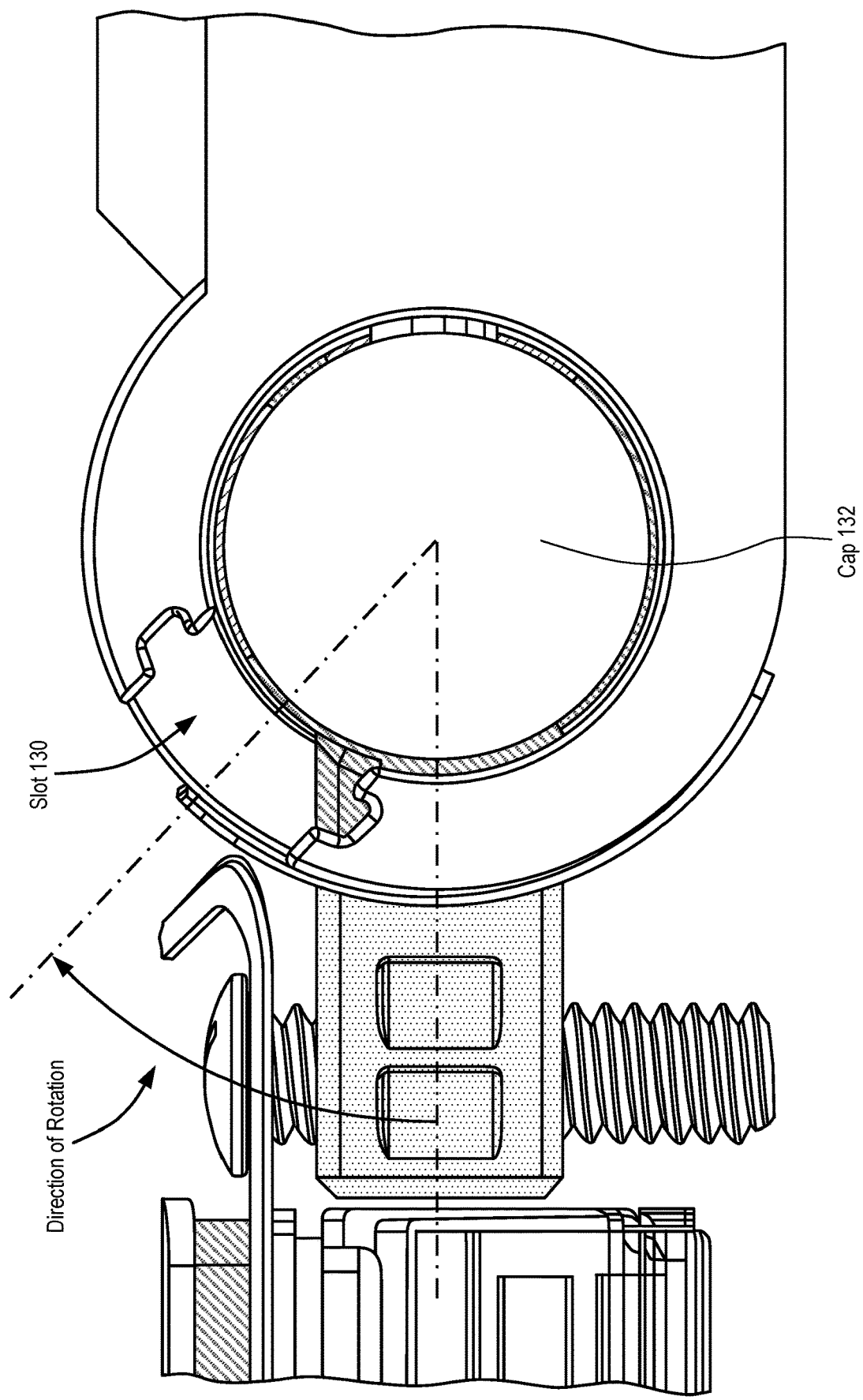
FIG. 4E is a close-up bottom view of an example artificial-reality device, including a hinge, in accordance with some embodiments.

FIG. 4D is another close-up side view of the example artificial-reality device 100. In this example, the hinge 114 is in the first state. FIG. 4D shows the elongated portion 123 extending into the temple section 110. In practice, the portions of the hinge 114 shown in FIG. 4D could be covered to prevent debris from interfering with the operation of the hinge 114.

FIG. 4E is a close up bottom view of the artificial-reality device 100 in accordance with some embodiments. The bottom view shows a slot 130 defined by the enclosure 120. In some embodiments, to assemble the hinge 114, the elongated portion 123 of the rear magnetic component 122 is passed through the slot 130 (e.g., at a 45-degree angle).

After the rear magnetic component 122 is passed through the slot 130 and rotated, an enclosure cap 126 (e.g., stopper) is inserted into the slot 130 (as shown in FIG. 4B). Alternatively, in some embodiments, a cap 132 is press fit into an opening defined by the enclosure 120, which prevents the rear magnetic component 122 from passing through the slot 130 after assembly. The assembly process discussed above is advantageous because the hinge can be quickly disassembled and cleaned as needed (or replaced in the event that the hinge 114 includes a faulty component).

FIG. 5A is another cross-section view of the artificial-reality device 100 in accordance with some embodiments. Specifically, the cross-section view is a top cross-section view, and corresponds to the close-up top view of FIG. 3B. FIG. 5A, while similar to FIG. 4A, shows additional details not shown in FIG. 4A, namely (i) the path of the transmission line 118 from the temple section 110 to the front section 112 and (ii) the negative and positive poles of each distinct magnet included in the rear magnetic component 122 and the front magnetic component 124. FIG. 5A shows the hinge 114 in the first state, i.e., the primary magnet 128-A of the rear magnetic component 122 is adjacent to and magnetically attracted to the static magnet 127 of the front magnetic component 124.

FIG. 5B is another cross-section view of the artificial-reality device 100 in accordance with some embodiments. FIG. 5B shows the hinge 114 in the second state (e.g., the other primary magnet 128-B of the rear magnetic component 122 is adjacent to and magnetically attracted to the static magnet 127 of the front magnetic component 124). Also, FIG. 5B shows the path of the transmission line 118, and the how the transmission line 118 is able to swivel in the opening 302 defined by the hinge 114. In this arrangement, the transmission line 118 experiences a low amount of stress when the hinge transitions between the first and second states. Thus, the hinge design described herein does not damage the transmission line 118, thus extending the life of the artificial-reality device as a whole.

FIG. 5C is a close-up view of the hinge 114 in accordance with some embodiments. Like FIG. 5A, FIG. 5C shows the negative and positive poles of each distinct magnet included in the rear magnetic component 122 and the front magnetic component 124. FIG. 5C shows the hinge 114 in the first state, such that the primary magnet 128-A of the rear magnetic component 122 is adjacent to and magnetically attracted to the static magnet 127 of the front magnetic component 124 (e.g., the poles of the primary magnet 128-A and the static magnet 127 closest to each other are opposite, and are thus attracted to each other).

FIG. 5C also shows a spring 502 included in the rear magnetic component 122. The spring 502 is configured to push (i.e., bias) the temple section 110 inwards when the rear magnetic component 122 is in the position shown in FIG. 5C. Pushing the temple section 110 inwards causes the temple section to press against a temple area of a person wearing the artificial-reality device, thereby creating a temple force. In some embodiments, the temple force applied to the temple area of the person wearing the artificial-reality device is approximately 0.2 newton meters, which is similar to temple forces applied to wearers of traditional glasses.

It is noted that the other routing strategies for the transmission line 118 are possible (i.e., a shape of the transmission line 118 passing through the hinge 114 is not limited to the specific S-shape detailed above). Furthermore, in some instances, the transmission line 118 may not pass through the hinge 114. Such situations may arise when the electronics and other processors/engines for the artificial-reality device are located in the front section 112.

Embodiments of this disclosure may include or be implemented in conjunction with various types of artificial-reality systems. Artificial reality may constitute a form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial-reality systems are designed to work without near-eye displays (NEDs), an example of which is the artificial-reality system 600 in FIG. 6. Other artificial-reality systems include an NED, which provides visibility into the real world (e.g., the augmented-reality (AR) system 700 in FIG. 7) or that visually immerses a user in an artificial reality (e.g., the virtual-reality (VR) system 800 in FIG. 8). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
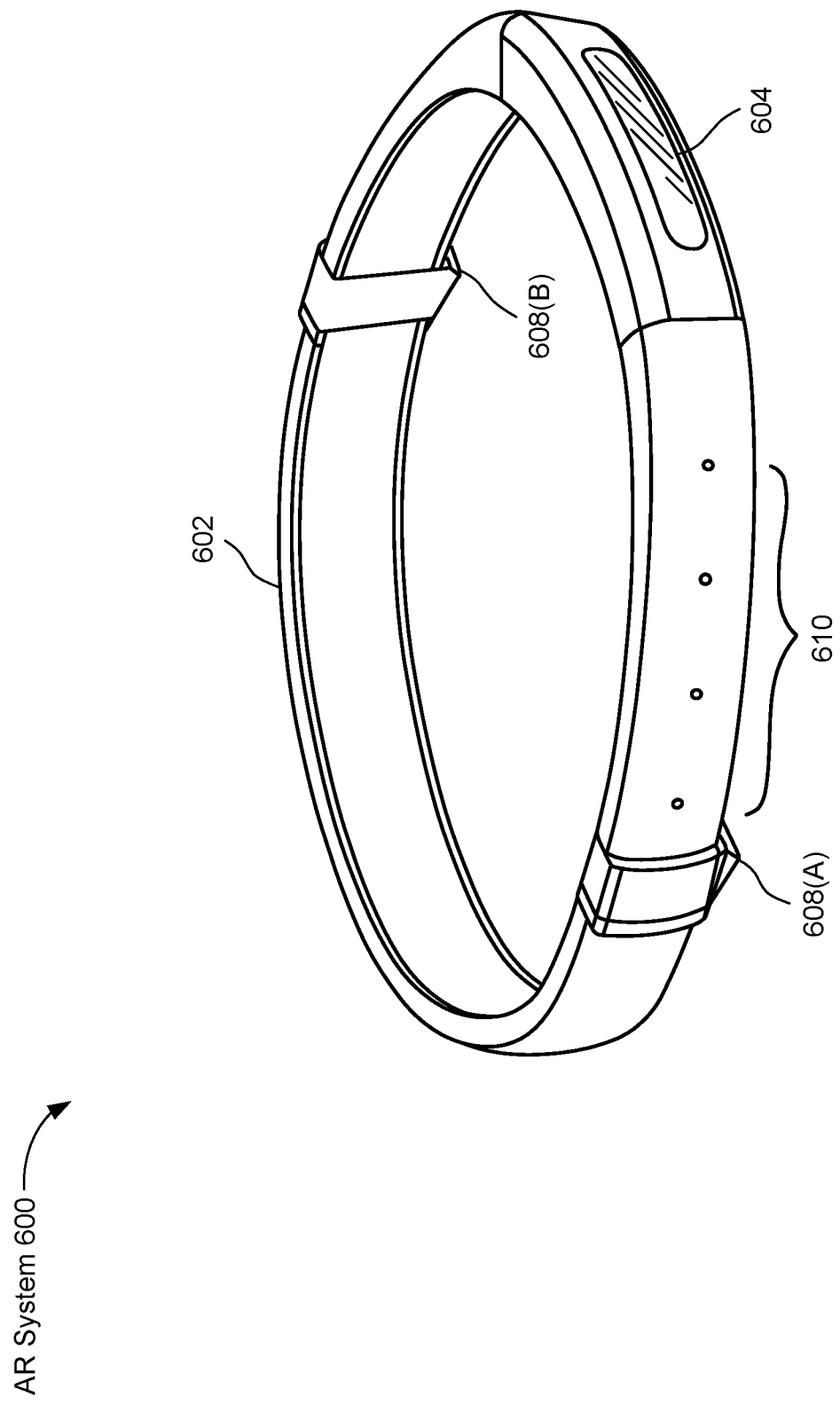
FIG. 6 illustrates an embodiment of an artificial reality device.
Figure 7:
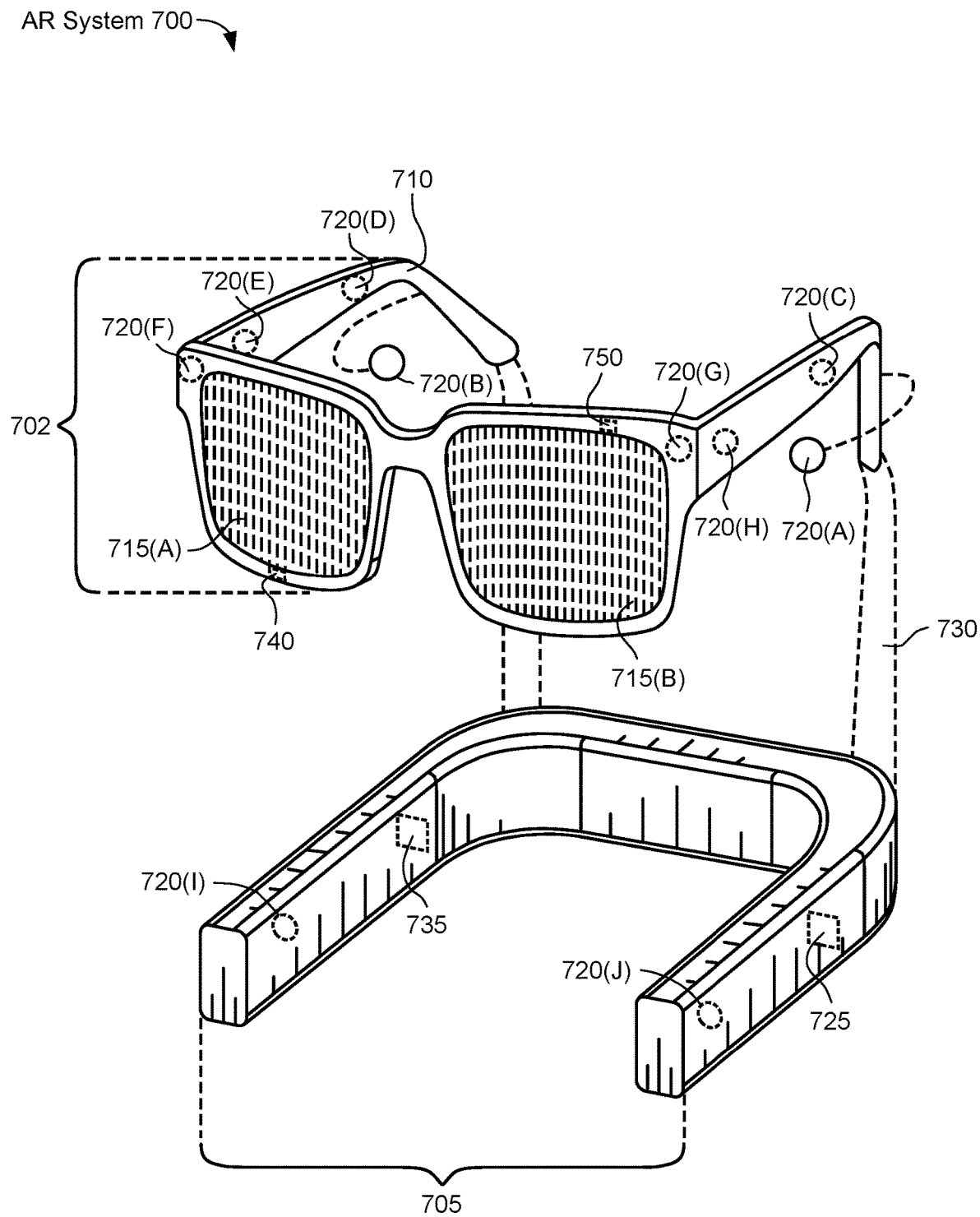
FIG. 7 illustrates an embodiment of an augmented reality headset and a corresponding neckband.
Figure 8:
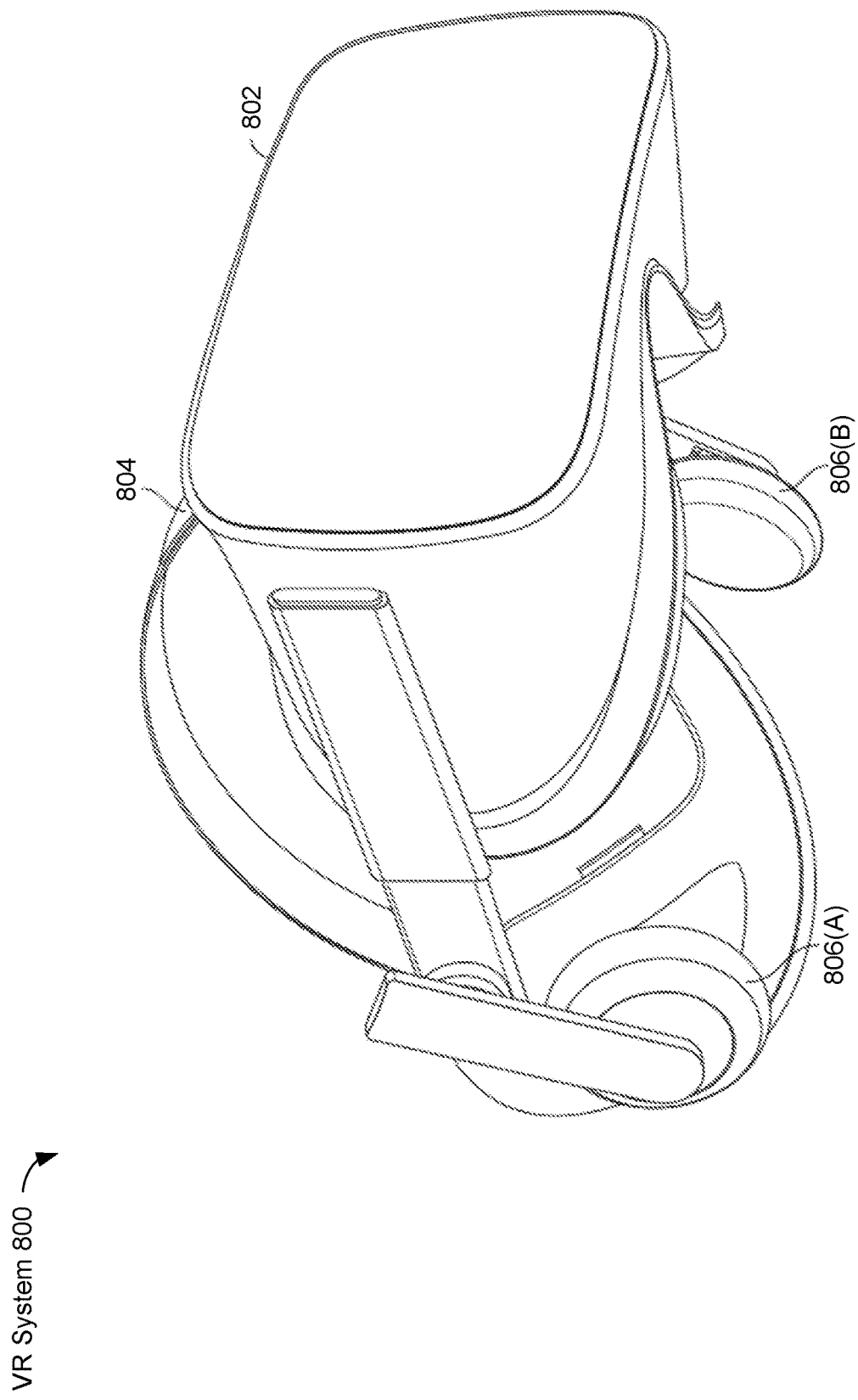
FIG. 8 illustrates an embodiment of a virtual reality headset.

FIGS. 6-8 provide additional examples of the devices used in the system 200. The artificial-reality system 600 in FIG. 6 generally represents a wearable device dimensioned to fit about a body part (e.g., a head) of a user. As shown, the artificial-reality system 600 includes a frame 602 (e.g., a band or wearable structure) and a camera assembly 604, which is coupled to the frame 602 and configured to gather information about a local environment by observing the local environment (and may include a display 604 that displays a user interface). In some embodiments, the artificial-reality system 600 includes output transducers 608(A) and 608(B) and input transducers 610. The output transducers 608(A) and 608(B) may provide audio feedback, haptic feedback, and/or content to a user, and the input audio transducers may capture audio (or other signals/waves) in a user's environment.

Thus, the artificial-reality system 600 does not include a near-eye display (NED) positioned in front of a user's eyes. Artificial-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the artificial-reality system 600 may not include an NED, the artificial-reality system 600 may include other types of screens or visual feedback devices (e.g., a display screen integrated into a side of the frame 602).

The embodiments discussed in this disclosure may also be implemented in artificial-reality systems that include one or more NEDs. For example, as shown in FIG. 7, the AR system 700 may include an eyewear device 702 with a frame 710 configured to hold a left display device 715(A) and a right display device 715(B) in front of a user's eyes. The display devices 715(A) and 715(B) may act together or independently to present an image or series of images to a user. While the AR system 700 includes two displays, embodiments of this disclosure may be implemented in AR systems with a single NED or more than two NEDs. The AR system 700 is an example of the display device 100.

In some embodiments, the AR system 700 includes one or more sensors, such as the sensors 740 and 750. The sensors 740 and 750 may generate measurement signals in response to motion of the AR system 700 and may be located on substantially any portion of the frame 710. Each sensor may be a position sensor, an inertial measurement unit (IMU), a depth camera assembly, or any combination thereof. The AR system 700 may or may not include sensors or may include more than one sensor. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 700 may also include a microphone array with a plurality of acoustic sensors 720(A)-720(J), referred to collectively as the acoustic sensors 720. The acoustic sensors 720 may be transducers that detect air pressure variations induced by sound waves. Each acoustic sensor 720 may be configured to detect sound and convert the detected sound into an electronic format (e.g., an analog or digital format). The microphone array in FIG. 7 may include, for example, ten acoustic sensors: 720(A) and 720(B), which may be designed to be placed inside a corresponding ear of the user, acoustic sensors 720(C), 720(D), 720(E), 720(F), 720(G), and 720(H), which may be positioned at various locations on the frame 710, and/or acoustic sensors 720(I) and 720(J), which may be positioned on a corresponding neckband 705. In some embodiments, the neckband 705 is an example of a computer system.

The configuration of the acoustic sensors 720 of the microphone array may vary. While the AR system 700 is shown in FIG. 7 having ten acoustic sensors 720, the number of acoustic sensors 720 may be greater or less than ten. In some embodiments, using more acoustic sensors 720 may increase the amount of audio information collected and/or the sensitivity and accuracy of the audio information. In contrast, using a lower number of acoustic sensors 720 may decrease the computing power required by a controller 725 to process the collected audio information. In addition, the position of each acoustic sensor 720 of the microphone array may vary. For example, the position of an acoustic sensor 720 may include a defined position on the user, a defined coordinate on the frame 710, an orientation associated with each acoustic sensor, or some combination thereof.

The acoustic sensors 720(A) and 720(B) may be positioned on different parts of the user's ear, such as behind the pinna or within the auricle or fossa. Or, there may be additional acoustic sensors on or surrounding the ear in addition to acoustic sensors 720 inside the ear canal. Having an acoustic sensor positioned next to an ear canal of a user may enable the microphone array to collect information on how sounds arrive at the ear canal. By positioning at least two of the acoustic sensors 720 on either side of a user's head (e.g., as binaural microphones), the AR device 700 may simulate binaural hearing and capture a 3D stereo sound field around about a user's head. In some embodiments, the acoustic sensors 720(A) and 720(B) may be connected to the AR system 700 via a wired connection, and in other embodiments, the acoustic sensors 720(A) and 720(B) may be connected to the AR system 700 via a wireless connection (e.g., a Bluetooth connection).

The acoustic sensors 720 on the frame 710 may be positioned along the length of the temples, across the bridge, above or below the display devices 715(A) and 715(B), or some combination thereof. The acoustic sensors 720 may be oriented such that the microphone array is able to detect sounds in a wide range of directions surrounding the user wearing AR system 700. In some embodiments, an optimization process may be performed during manufacturing of the AR system 700 to determine relative positioning of each acoustic sensor 720 in the microphone array.

The AR system 700 may further include or be connected to an external device (e.g., a paired device), such as a neckband 705. As shown, the neckband 705 may be coupled to the eyewear device 702 via one or more connectors 730. The connectors 730 may be wired or wireless connectors and may include electrical and/or non-electrical (e.g., structural) components. In some cases, the eyewear device 702 and the neckband 705 operate independently without any wired or wireless connection between them. While FIG. 7 illustrates the components of the eyewear device 702 and the neckband 705 in example locations on the eyewear device 702 and the neckband 705, the components may be located elsewhere and/or distributed differently on the eyewear device 702 and/or the neckband 705. In some embodiments, the components of the eyewear device 702 and the neckband 705 may be located on one or more additional peripheral devices paired with the eyewear device 702, the neckband 705, or some combination thereof. Furthermore, the neckband 705 generally represents any type or form of paired device. Thus, the following discussion of neckband 705 may also apply to various other paired devices, such as smart watches, smart phones, wrist bands, other wearable devices, hand-held controllers, tablet computers, or laptop computers.

Pairing external devices, such as a neckband 705, with AR eyewear devices may enable the eyewear devices to achieve the form factor of a pair of glasses while still providing sufficient battery and computation power for expanded capabilities. Some or all of the battery power, computational resources, and/or additional features of the AR system 700 may be provided by a paired device or shared between a paired device and an eyewear device, thus reducing the weight, heat profile, and form factor of the eyewear device overall while still retaining desired functionality. For example, the neckband 705 may allow components that would otherwise be included on an eyewear device to be included in the neckband 705 because users may tolerate a heavier weight load on their shoulders than they would tolerate on their heads. The neckband 705 may also have a larger surface area over which to diffuse and disperse heat to the ambient environment. Thus, the neckband 705 may allow for greater battery and computation capacity than might otherwise have been possible on a stand-alone eyewear device. Because weight carried in the neckband 705 may be less invasive to a user than weight carried in the eyewear device 702, a user may tolerate wearing a lighter eyewear device and carrying or wearing the paired device for greater lengths of time than the user would tolerate wearing a heavy standalone eyewear device, thereby enabling an artificial-reality environment to be incorporated more fully into a user's day-to-day activities.

The neckband 705 may be communicatively coupled with the eyewear device 702 and/or to other devices (e.g., a wearable device). The other devices may provide certain functions (e.g., tracking, localizing, depth mapping, processing, storage, etc.) to the AR system 700. In the embodiment of FIG. 7, the neckband 705 may include two acoustic sensors 720(I) and 720(J), which are part of the microphone array (or potentially form their own microphone subarray). The neckband 705 may also include a controller 725 and a power source 735.

The acoustic sensors 720(I) and 720(J) of the neckband 705 may be configured to detect sound and convert the detected sound into an electronic format (analog or digital). In the embodiment of FIG. 7, the acoustic sensors 720(I) and 720(J) may be positioned on the neckband 705, thereby increasing the distance between neckband acoustic sensors 720(I) and 720(J) and the other acoustic sensors 720 positioned on the eyewear device 702. In some cases, increasing the distance between the acoustic sensors 720 of the microphone array may improve the accuracy of beamforming performed via the microphone array. For example, if a sound is detected by the acoustic sensors 720(C) and 720(D) and the distance between acoustic sensors 720(C) and 720(D) is greater than, for example, the distance between the acoustic sensors 720(D) and 720(E), the determined source location of the detected sound may be more accurate than if the sound had been detected by the acoustic sensors 720(D) and 720(E).

The controller 725 of the neckband 705 may process information generated by the sensors on the neckband 705 and/or the AR system 700. For example, the controller 725 may process information from the microphone array, which describes sounds detected by the microphone array. For each detected sound, the controller 725 may perform a direction of arrival (DOA) estimation to estimate a direction from which the detected sound arrived at the microphone array. As the microphone array detects sounds, the controller 725 may populate an audio data set with the information. In embodiments in which the AR system 700 includes an IMU, the controller 725 may compute all inertial and spatial calculations from the IMU located on the eyewear device 702. The connector 730 may convey information between the AR system 700 and the neckband 705 and between the AR system 700 and the controller 725. The information may be in the form of optical data, electrical data, wireless data, or any other transmittable data form. Moving the processing of information generated by the AR system 700 to the neckband 705 may reduce weight and heat in the eyewear device 702, making it more comfortable to a user.

The power source 735 in the neckband 705 may provide power to the eyewear device 702 and/or to the neckband 705. The power source 735 may include, without limitation, lithium-ion batteries, lithium-polymer batteries, primary lithium batteries, alkaline batteries, or any other form of power storage. In some cases, the power source 735 may be a wired power source. Including the power source 735 on the neckband 705 instead of on the eyewear device 702 may help better distribute the weight and heat generated by the power source 735.

As noted, some artificial-reality systems may, instead of blending an artificial-reality with actual reality, substantially replace one or more of a user's sensory perceptions of the real world with a virtual experience. One example of this type of system is a head-worn display system, such as the VR system 800 in FIG. 8, which mostly or completely covers a user's field of view. The VR system 800 may include a front rigid body 802 and a band 804 shaped to fit around a user's head. In some embodiments, the VR system 800 includes output audio transducers 806(A) and 806(B), as shown in FIG. 8. Furthermore, while not shown in FIG. 8, the front rigid body 802 may include one or more electronic elements, including one or more electronic displays, one or more IMUs, one or more tracking emitters or detectors, and/or any other suitable device or system for creating an artificial-reality experience.

Artificial-reality systems may include a variety of types of visual feedback mechanisms. For example, display devices in the AR system 700 and/or the VR system 800 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems also include optical subsystems having one or more lenses (e.g., conventional concave or convex lenses, Fresnel lenses, or adjustable liquid lenses) through which a user may view a display screen. These systems and mechanisms are discussed in further detail above with reference to FIG. 2.

In addition to or instead of using display screens, some artificial-reality systems include one or more projection systems. For example, display devices in the AR system 700 and/or the VR system 800 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 600, the AR system 700, and/or the VR system 800 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 6 and 8, the output audio transducers 608(A), 608(B), 806(A), and 806(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 610 may include condenser microphones, dynamic microphones, ribbon microphones, and/or any other type or form of input transducer. In some embodiments, a single transducer may be used for both audio input and audio output.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including Wi-Fi, Bluetooth, global positioning system (GPS), cellular or other communication devices may also be used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as the systems 600, 700, and 800) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's artificial-reality device on demand.

When a user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a Direction of Arrival ("DOA") analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy, including ear canal length and the positioning of the ear drum. The artificial-reality device may provide an alignment and orientation guide, which the user may follow to customize the sound signal presented to the user based on a personal HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial-reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (e.g., using any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

Although some of the various drawings illustrate a number of logical stages in a particular order, stages that are not order-dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An artificial-reality device comprising:
 a head-mounted display including:
  a frame that includes at least one temple section and a front section, wherein the front section is configured to hold at least one lens; and
  a hinge pivotally coupling the at least one temple section and the front section,
 wherein the hinge comprises:
  a front magnetic component including a static magnet; and
  a rear magnetic component, coupled to the at least one temple section, including two or more primary magnets oriented so as to be attracted to the static magnet of the front magnetic component and at least one secondary magnet, positioned between the two or more primary magnets, oriented so as to be repelled by the static magnet of the front magnetic component.

2. The artificial-reality device of claim 1, wherein:
 when the hinge is in a first state, a first magnet of the two or more primary magnets is adjacent and magnetically attracted to the static magnet of the front magnetic component; and when the hinge is in a second state, a second magnet of the two or more primary magnets is adjacent and magnetically attracted to the static magnet of the front magnetic component.

3. The artificial-reality device of claim 2, wherein:
when the hinge is in a third state, the at least one secondary magnet is adjacent to and magnetically repelled by the static magnet of the front magnetic component.

4. The artificial-reality device of claim 2, wherein the hinge includes another secondary magnet, positioned adjacent to the second magnet of the two or more primary magnets, that is magnetically repelled by the static magnet of the front magnetic component when the hinge is in the second state.

5. The artificial-reality device of claim 2, wherein:
when the hinge is in the first state, the rear magnetic component is in a first position; and
when the hinge is in the second state, the rear magnetic component is in a second position different from the first position.

6. The artificial-reality device of claim 5, wherein the rear magnetic component is rotated a predetermined amount to transition from the first position to the second position.

7. The artificial-reality device of claim 6, wherein the predetermined amount is at least 50 degrees.

8. The artificial-reality device of claim 5, wherein the rear magnetic component includes a spring configured to push the at least one temple section inwards when the rear magnetic component is in the first position.

9. The artificial-reality device of claim 1, wherein:
the rear magnetic component of the hinge includes an opening; and
the artificial-reality device further includes a transmission line that conveys data between the at least one temple section and the front section, whereby the transmission line passes through the opening of the rear magnetic component.

10. The artificial-reality device of claim 9, further comprising an artificial-reality engine that generates artificial-reality data,
wherein:
the at least one lens is an electronic display that is configured to display the artificial-reality data generated by the artificial-reality engine; and
the transmission line conveys the artificial-reality data to the electronic display from the artificial-reality engine.

11. The artificial-reality device of claim 9, wherein:
the hinge is configured to rotate about a first axis; and
the opening of the hinge is defined along the first axis.

12. The artificial-reality device of claim 1, wherein:
the hinge further includes an enclosure integrated with the front section; and
the front magnetic component is coupled to a portion of the enclosure.

13. The artificial-reality device of claim 12, wherein:
the enclosure of the hinge comprises an opening at one end; and
an elongated portion of the rear magnetic component is inserted through the opening to assemble the hinge.

14. The artificial-reality device of claim 13, wherein the hinge includes a cap that fits into the opening of the enclosure.

15. A magnetic hinge comprising:
a front magnetic component including a static magnet; and
a rear magnetic component, coupled to an arm of an optical device, including two or more primary magnets oriented so as to be attracted to the static magnet of the front magnetic component and at least one secondary magnet, positioned between the two or more primary magnets, oriented so as to be repelled by the static magnet of the front magnetic component.

16. The magnetic hinge of claim 15, wherein the optical device is an artificial-reality device.

17. The magnetic hinge of claim 15, further comprising:
a first channel that defines an inlet of the magnetic hinge;
a second channel that defines an outlet of the magnetic hinge; and
an opening connecting the first channel to the second channel, whereby an orientation of the opening is perpendicular to orientations of the first and second channels.

18. The magnetic hinge of claim 17, wherein a transmission line of the optical device, which conveys data to an electronic display of the optical device, is positioned in the first channel, passed through the opening, and positioned in the second channel.

19. The magnetic hinge of claim 15, wherein:
when the hinge is in a first state, a first magnet of the two or more primary magnets is adjacent and magnetically attracted to the static magnet of the front magnetic component; and
when the hinge is in a second state, a second magnet of the two or more primary magnets is adjacent and magnetically attracted to the static magnet of the front magnetic component.

20. The magnetic hinge of claim 19, wherein:
when the hinge is in a third state, the at least one secondary magnet is adjacent to and magnetically repelled by the static magnet of the front magnetic component.

* * * * *